(12) United States Patent
Chen

(10) Patent No.: US 8,762,156 B2
(45) Date of Patent: Jun. 24, 2014

(54) SPEECH RECOGNITION REPAIR USING CONTEXTUAL INFORMATION

(75) Inventor: Lik Harry Chen, San Jose, CA (US)

(73) Assignee: Apple Inc., Cupertino, CA (US)

( * ) Notice: Subject to any disclaimer, the term of this patent is extended or adjusted under 35 U.S.C. 154(b) by 336 days.

(21) Appl. No.: 13/247,912

(22) Filed: Sep. 28, 2011

(65) Prior Publication Data

US 2013/0080177 A1   Mar. 28, 2013

(51) Int. Cl.

| | |
|---|---|
| *G06F 17/27* | (2006.01) |
| *G06F 17/21* | (2006.01) |
| *G10L 15/26* | (2006.01) |
| *G10L 15/06* | (2013.01) |
| *G10L 17/00* | (2013.01) |
| *G10L 15/04* | (2013.01) |
| *G10L 13/00* | (2006.01) |
| *G10L 21/00* | (2013.01) |

(52) U.S. Cl.
USPC ............ 704/275; 704/9; 704/10; 704/235; 704/245; 704/246; 704/251; 704/265; 704/270; 704/270.1

(58) Field of Classification Search
USPC ............ 704/9, 10, 235, 245, 246, 251, 265, 704/270, 270.1, 275
See application file for complete search history.

(56) References Cited

U.S. PATENT DOCUMENTS

| | | |
|---|---|---|
| 3,704,345 A | 11/1972 | Coker et al. |
| 3,828,132 A | 8/1974 | Flanagan et al. |
| 3,979,557 A | 9/1976 | Schulman et al. |
| 4,278,838 A | 7/1981 | Antonov |
| 4,282,405 A | 8/1981 | Taguchi |
| 4,310,721 A | 1/1982 | Manley et al. |
| 4,348,553 A | 9/1982 | Baker et al. |
| 4,653,021 A | 3/1987 | Takagi |
| 4,688,195 A | 8/1987 | Thompson et al. |
| 4,692,941 A | 9/1987 | Jacks et al. |
| 4,718,094 A | 1/1988 | Bahl et al. |
| 4,724,542 A | 2/1988 | Williford |

(Continued)

FOREIGN PATENT DOCUMENTS

| | | |
|---|---|---|
| CH | 681573 A5 | 4/1993 |
| DE | 3837590 A1 | 5/1990 |

(Continued)

OTHER PUBLICATIONS

Martin, D., et al., "The Open Agent Architecture: A Framework for building distributed software systems," Jan.-Mar. 1999, Applied Artificial Intelligence: An International Journal, vol. 13, No. 1-2, http://adam.cheyer.com/papers/oaa.pdf, 38 pages.

(Continued)

*Primary Examiner* — Edgar Guerra-Erazo
(74) *Attorney, Agent, or Firm* — Morrison & Foerster LLP

(57) ABSTRACT

A speech control system that can recognize a spoken command and associated words (such as "call mom at home") and can cause a selected application (such as a telephone dialer) to execute the command to cause a data processing system, such as a smartphone, to perform an operation based on the command (such as look up mom's phone number at home and dial it to establish a telephone call). The speech control system can use a set of interpreters to repair recognized text from a speech recognition system, and results from the set can be merged into a final repaired transcription which is provided to the selected application.

23 Claims, 11 Drawing Sheets

(56) References Cited

U.S. PATENT DOCUMENTS

| | | |
|---|---|---|
| 4,726,065 A | 2/1988 | Froessl |
| 4,727,354 A | 2/1988 | Lindsay |
| 4,776,016 A | 10/1988 | Hansen |
| 4,783,807 A | 11/1988 | Marley |
| 4,811,243 A | 3/1989 | Racine |
| 4,819,271 A | 4/1989 | Bahl et al. |
| 4,827,520 A | 5/1989 | Zeinstra |
| 4,829,576 A | 5/1989 | Porter |
| 4,833,712 A | 5/1989 | Bahl et al. |
| 4,839,853 A | 6/1989 | Deerwester et al. |
| 4,852,168 A | 7/1989 | Sprague |
| 4,862,504 A | 8/1989 | Nomura |
| 4,878,230 A | 10/1989 | Murakami et al. |
| 4,903,305 A | 2/1990 | Gillick et al. |
| 4,905,163 A | 2/1990 | Garber et al. |
| 4,914,586 A | 4/1990 | Swinehart et al. |
| 4,914,590 A | 4/1990 | Loatman et al. |
| 4,944,013 A | 7/1990 | Gouvianakis et al. |
| 4,955,047 A | 9/1990 | Morganstein et al. |
| 4,965,763 A | 10/1990 | Zamora |
| 4,974,191 A | 11/1990 | Amirghodsi et al. |
| 4,977,598 A | 12/1990 | Doddington et al. |
| 4,992,972 A | 2/1991 | Brooks et al. |
| 5,010,574 A | 4/1991 | Wang |
| 5,020,112 A | 5/1991 | Chou |
| 5,021,971 A | 6/1991 | Lindsay |
| 5,022,081 A | 6/1991 | Hirose et al. |
| 5,027,406 A | 6/1991 | Roberts et al. |
| 5,031,217 A | 7/1991 | Nishimura |
| 5,032,989 A | 7/1991 | Tornetta |
| 5,040,218 A | 8/1991 | Vitale et al. |
| 5,047,614 A | 9/1991 | Bianco |
| 5,057,915 A | 10/1991 | Von Kohorn |
| 5,072,452 A | 12/1991 | Brown et al. |
| 5,091,945 A | 2/1992 | Kleijn |
| 5,127,053 A | 6/1992 | Koch |
| 5,127,055 A | 6/1992 | Larkey |
| 5,128,672 A | 7/1992 | Kaehler |
| 5,133,011 A | 7/1992 | McKiel, Jr. |
| 5,142,584 A | 8/1992 | Ozawa |
| 5,164,900 A | 11/1992 | Bernath |
| 5,165,007 A | 11/1992 | Bahl et al. |
| 5,179,652 A | 1/1993 | Rozmanith et al. |
| 5,194,950 A | 3/1993 | Murakami et al. |
| 5,197,005 A | 3/1993 | Shwartz et al. |
| 5,199,077 A | 3/1993 | Wilcox et al. |
| 5,202,952 A | 4/1993 | Gillick et al. |
| 5,208,862 A | 5/1993 | Ozawa |
| 5,216,747 A | 6/1993 | Hardwick et al. |
| 5,220,639 A | 6/1993 | Lee |
| 5,220,657 A | 6/1993 | Bly et al. |
| 5,222,146 A | 6/1993 | Bahl et al. |
| 5,230,036 A | 7/1993 | Akamine et al. |
| 5,235,680 A | 8/1993 | Bijnagte |
| 5,267,345 A | 11/1993 | Brown et al. |
| 5,268,990 A | 12/1993 | Cohen et al. |
| 5,282,265 A | 1/1994 | Rohra Suda et al. |
| RE34,562 E | 3/1994 | Murakami et al. |
| 5,291,286 A | 3/1994 | Murakami et al. |
| 5,293,448 A | 3/1994 | Honda |
| 5,293,452 A | 3/1994 | Picone et al. |
| 5,297,170 A | 3/1994 | Eyuboglu et al. |
| 5,301,109 A | 4/1994 | Landauer et al. |
| 5,303,406 A | 4/1994 | Hansen et al. |
| 5,309,359 A | 5/1994 | Katz et al. |
| 5,317,507 A | 5/1994 | Gallant |
| 5,317,647 A | 5/1994 | Pagallo |
| 5,325,297 A | 6/1994 | Bird et al. |
| 5,325,298 A | 6/1994 | Gallant |
| 5,327,498 A | 7/1994 | Hamon |
| 5,333,236 A | 7/1994 | Bahl et al. |
| 5,333,275 A | 7/1994 | Wheatley et al. |
| 5,345,536 A | 9/1994 | Hoshimi et al. |
| 5,349,645 A | 9/1994 | Zhao |
| 5,353,377 A | 10/1994 | Kuroda et al. |
| 5,377,301 A | 12/1994 | Rosenberg et al. |
| 5,384,892 A | 1/1995 | Strong |
| 5,384,893 A | 1/1995 | Hutchins |
| 5,386,494 A | 1/1995 | White |
| 5,386,556 A | 1/1995 | Hedin et al. |
| 5,390,279 A | 2/1995 | Strong |
| 5,396,625 A | 3/1995 | Parkes |
| 5,400,434 A | 3/1995 | Pearson |
| 5,404,295 A | 4/1995 | Katz et al. |
| 5,412,756 A | 5/1995 | Bauman et al. |
| 5,412,804 A | 5/1995 | Krishna |
| 5,412,806 A | 5/1995 | Du et al. |
| 5,418,951 A | 5/1995 | Damashek |
| 5,424,947 A | 6/1995 | Nagao et al. |
| 5,434,777 A | 7/1995 | Luciw |
| 5,444,823 A | 8/1995 | Nguyen |
| 5,455,888 A | 10/1995 | Iyengar et al. |
| 5,469,529 A | 11/1995 | Bimbot et al. |
| 5,471,611 A | 11/1995 | McGregor |
| 5,475,587 A | 12/1995 | Anick et al. |
| 5,479,488 A | 12/1995 | Lennig et al. |
| 5,491,772 A | 2/1996 | Hardwick et al. |
| 5,493,677 A | 2/1996 | Balogh |
| 5,495,604 A | 2/1996 | Harding et al. |
| 5,502,790 A | 3/1996 | Yi |
| 5,502,791 A | 3/1996 | Nishimura et al. |
| 5,515,475 A | 5/1996 | Gupta et al. |
| 5,536,902 A | 7/1996 | Serra et al. |
| 5,537,618 A | 7/1996 | Boulton et al. |
| 5,574,823 A | 11/1996 | Hassanein et al. |
| 5,577,241 A | 11/1996 | Spencer |
| 5,578,808 A | 11/1996 | Taylor |
| 5,579,436 A | 11/1996 | Chou et al. |
| 5,581,655 A | 12/1996 | Cohen et al. |
| 5,584,024 A | 12/1996 | Shwartz |
| 5,596,676 A | 1/1997 | Swaminathan et al. |
| 5,596,994 A | 1/1997 | Bro |
| 5,608,624 A | 3/1997 | Luciw |
| 5,613,036 A | 3/1997 | Strong |
| 5,617,507 A | 4/1997 | Lee et al. |
| 5,619,694 A | 4/1997 | Shimazu |
| 5,621,859 A | 4/1997 | Schwartz et al. |
| 5,621,903 A | 4/1997 | Luciw et al. |
| 5,642,464 A | 6/1997 | Yue et al. |
| 5,642,519 A | 6/1997 | Martin |
| 5,644,727 A | 7/1997 | Atkins |
| 5,664,055 A | 9/1997 | Kroon |
| 5,675,819 A | 10/1997 | Schuetze |
| 5,682,539 A | 10/1997 | Conrad et al. |
| 5,687,077 A | 11/1997 | Gough, Jr. |
| 5,696,962 A | 12/1997 | Kupiec |
| 5,701,400 A | 12/1997 | Amado |
| 5,706,442 A | 1/1998 | Anderson et al. |
| 5,710,886 A | 1/1998 | Christensen et al. |
| 5,712,957 A | 1/1998 | Waibel et al. |
| 5,715,468 A | 2/1998 | Budzinski |
| 5,721,827 A | 2/1998 | Logan et al. |
| 5,727,950 A | 3/1998 | Cook et al. |
| 5,729,694 A | 3/1998 | Holzrichter et al. |
| 5,732,390 A | 3/1998 | Katayanagi et al. |
| 5,734,791 A | 3/1998 | Acero et al. |
| 5,737,734 A | 4/1998 | Schultz |
| 5,748,974 A | 5/1998 | Johnson |
| 5,749,081 A | 5/1998 | Whiteis |
| 5,759,101 A | 6/1998 | Von Kohorn |
| 5,790,978 A | 8/1998 | Olive et al. |
| 5,794,050 A | 8/1998 | Dahlgren et al. |
| 5,794,182 A | 8/1998 | Manduchi et al. |
| 5,794,207 A | 8/1998 | Walker et al. |
| 5,794,237 A | 8/1998 | Gore, Jr. |
| 5,799,276 A | 8/1998 | Komissarchik et al. |
| 5,822,743 A | 10/1998 | Gupta et al. |
| 5,825,881 A | 10/1998 | Colvin, Sr. |
| 5,826,261 A | 10/1998 | Spencer |
| 5,828,999 A | 10/1998 | Bellegarda et al. |
| 5,835,893 A | 11/1998 | Ushioda |
| 5,839,106 A | 11/1998 | Bellegarda |
| 5,845,255 A | 12/1998 | Mayaud |
| 5,857,184 A | 1/1999 | Lynch |

(56) References Cited

U.S. PATENT DOCUMENTS

| | | | |
|---|---|---|---|
| 5,860,063 A | 1/1999 | Gorin et al. | |
| 5,862,223 A | 1/1999 | Walker et al. | |
| 5,864,806 A | 1/1999 | Mokbel et al. | |
| 5,864,844 A | 1/1999 | James et al. | |
| 5,867,799 A | 2/1999 | Lang et al. | |
| 5,873,056 A | 2/1999 | Liddy et al. | |
| 5,875,437 A | 2/1999 | Atkins | |
| 5,884,323 A | 3/1999 | Hawkins et al. | |
| 5,895,464 A | 4/1999 | Bhandari et al. | |
| 5,895,466 A | 4/1999 | Goldberg et al. | |
| 5,899,972 A | 5/1999 | Miyazawa et al. | |
| 5,909,666 A * | 6/1999 | Gould et al. | 704/251 |
| 5,913,193 A | 6/1999 | Huang et al. | |
| 5,915,236 A * | 6/1999 | Gould et al. | 704/251 |
| 5,915,249 A | 6/1999 | Spencer | |
| 5,920,836 A * | 7/1999 | Gould et al. | 704/251 |
| 5,920,837 A * | 7/1999 | Gould et al. | 704/251 |
| 5,930,769 A | 7/1999 | Rose | |
| 5,933,822 A | 8/1999 | Braden-Harder et al. | |
| 5,936,926 A | 8/1999 | Yokouchi et al. | |
| 5,940,811 A | 8/1999 | Norris | |
| 5,941,944 A | 8/1999 | Messerly | |
| 5,943,670 A | 8/1999 | Prager | |
| 5,948,040 A | 9/1999 | DeLorme et al. | |
| 5,956,699 A | 9/1999 | Wong et al. | |
| 5,960,394 A * | 9/1999 | Gould et al. | 704/270.1 |
| 5,960,422 A | 9/1999 | Prasad | |
| 5,963,924 A | 10/1999 | Williams et al. | |
| 5,966,126 A | 10/1999 | Szabo | |
| 5,970,474 A | 10/1999 | LeRoy et al. | |
| 5,974,146 A | 10/1999 | Randle et al. | |
| 5,982,891 A | 11/1999 | Ginter et al. | |
| 5,983,179 A * | 11/1999 | Gould | 704/270.1 |
| 5,987,132 A | 11/1999 | Rowney | |
| 5,987,140 A | 11/1999 | Rowney et al. | |
| 5,987,404 A | 11/1999 | Della Pietra et al. | |
| 5,987,440 A | 11/1999 | O'Neil et al. | |
| 5,999,908 A | 12/1999 | Abelow | |
| 6,016,471 A | 1/2000 | Kuhn et al. | |
| 6,023,684 A | 2/2000 | Pearson | |
| 6,024,288 A | 2/2000 | Gottlich et al. | |
| 6,026,345 A | 2/2000 | Shah et al. | |
| 6,026,375 A | 2/2000 | Hall et al. | |
| 6,026,388 A | 2/2000 | Liddy et al. | |
| 6,026,393 A | 2/2000 | Gupta et al. | |
| 6,029,132 A | 2/2000 | Kuhn et al. | |
| 6,038,533 A | 3/2000 | Buchsbaum et al. | |
| 6,052,656 A | 4/2000 | Suda et al. | |
| 6,055,514 A | 4/2000 | Wren | |
| 6,055,531 A | 4/2000 | Bennett et al. | |
| 6,064,959 A * | 5/2000 | Young et al. | 704/251 |
| 6,064,960 A | 5/2000 | Bellegarda et al. | |
| 6,070,139 A | 5/2000 | Miyazawa et al. | |
| 6,070,147 A | 5/2000 | Harms et al. | |
| 6,073,097 A * | 6/2000 | Gould et al. | 704/251 |
| 6,076,051 A | 6/2000 | Messerly et al. | |
| 6,076,088 A | 6/2000 | Paik et al. | |
| 6,078,914 A | 6/2000 | Redfern | |
| 6,081,750 A | 6/2000 | Hoffberg et al. | |
| 6,081,774 A | 6/2000 | de Hita et al. | |
| 6,088,731 A | 7/2000 | Kiraly et al. | |
| 6,092,043 A * | 7/2000 | Squires et al. | 704/251 |
| 6,094,649 A | 7/2000 | Bowen et al. | |
| 6,101,468 A * | 8/2000 | Gould et al. | 704/251 |
| 6,105,865 A | 8/2000 | Hardesty | |
| 6,108,627 A | 8/2000 | Sabourin | |
| 6,119,101 A | 9/2000 | Peckover | |
| 6,122,616 A | 9/2000 | Henton | |
| 6,125,356 A | 9/2000 | Brockman et al. | |
| 6,144,938 A | 11/2000 | Surace et al. | |
| 6,173,261 B1 | 1/2001 | Arai et al. | |
| 6,173,279 B1 | 1/2001 | Levin et al. | |
| 6,188,999 B1 | 2/2001 | Moody | |
| 6,195,641 B1 | 2/2001 | Loring et al. | |
| 6,205,456 B1 | 3/2001 | Nakao | |
| 6,208,971 B1 | 3/2001 | Bellegarda et al. | |
| 6,233,559 B1 | 5/2001 | Balakrishnan | |
| 6,233,578 B1 | 5/2001 | Machihara et al. | |
| 6,246,981 B1 | 6/2001 | Papineni et al. | |
| 6,260,024 B1 | 7/2001 | Shkedy | |
| 6,266,637 B1 | 7/2001 | Donovan et al. | |
| 6,275,824 B1 | 8/2001 | O'Flaherty et al. | |
| 6,285,786 B1 | 9/2001 | Seni et al. | |
| 6,308,149 B1 | 10/2001 | Gaussier et al. | |
| 6,311,189 B1 | 10/2001 | deVries et al. | |
| 6,317,594 B1 | 11/2001 | Gossman et al. | |
| 6,317,707 B1 | 11/2001 | Bangalore et al. | |
| 6,317,831 B1 | 11/2001 | King | |
| 6,321,092 B1 | 11/2001 | Fitch et al. | |
| 6,334,103 B1 | 12/2001 | Surace et al. | |
| 6,356,854 B1 | 3/2002 | Schubert et al. | |
| 6,356,905 B1 | 3/2002 | Gershman et al. | |
| 6,366,883 B1 | 4/2002 | Campbell et al. | |
| 6,366,884 B1 | 4/2002 | Bellegarda et al. | |
| 6,421,672 B1 | 7/2002 | McAllister et al. | |
| 6,434,524 B1 | 8/2002 | Weber | |
| 6,446,076 B1 | 9/2002 | Burkey et al. | |
| 6,449,620 B1 | 9/2002 | Draper et al. | |
| 6,453,292 B2 | 9/2002 | Ramaswamy et al. | |
| 6,460,029 B1 | 10/2002 | Fries et al. | |
| 6,466,654 B1 | 10/2002 | Cooper et al. | |
| 6,477,488 B1 | 11/2002 | Bellegarda | |
| 6,487,534 B1 | 11/2002 | Thelen et al. | |
| 6,499,013 B1 | 12/2002 | Weber | |
| 6,501,937 B1 | 12/2002 | Ho et al. | |
| 6,505,158 B1 | 1/2003 | Conkie | |
| 6,505,175 B1 | 1/2003 | Silverman et al. | |
| 6,505,183 B1 | 1/2003 | Loofbourrow et al. | |
| 6,510,417 B1 | 1/2003 | Woods et al. | |
| 6,513,063 B1 | 1/2003 | Julia et al. | |
| 6,523,061 B1 | 2/2003 | Halverson et al. | |
| 6,523,172 B1 | 2/2003 | Martinez-Guerra et al. | |
| 6,526,382 B1 | 2/2003 | Yuschik | |
| 6,526,395 B1 | 2/2003 | Morris | |
| 6,532,444 B1 | 3/2003 | Weber | |
| 6,532,446 B1 | 3/2003 | King | |
| 6,546,388 B1 | 4/2003 | Edlund et al. | |
| 6,553,344 B2 | 4/2003 | Bellegarda et al. | |
| 6,556,983 B1 | 4/2003 | Altschuler et al. | |
| 6,584,464 B1 | 6/2003 | Warthen | |
| 6,598,039 B1 | 7/2003 | Livowsky | |
| 6,601,026 B2 | 7/2003 | Appelt et al. | |
| 6,601,234 B1 | 7/2003 | Bowman-Amuah | |
| 6,604,059 B2 | 8/2003 | Strubbe et al. | |
| 6,615,172 B1 | 9/2003 | Bennett et al. | |
| 6,615,175 B1 | 9/2003 | Gazdzinski | |
| 6,615,220 B1 | 9/2003 | Austin et al. | |
| 6,625,583 B1 | 9/2003 | Silverman et al. | |
| 6,631,346 B1 | 10/2003 | Karaorman et al. | |
| 6,633,846 B1 | 10/2003 | Bennett et al. | |
| 6,647,260 B2 | 11/2003 | Dusse et al. | |
| 6,650,735 B2 | 11/2003 | Burton et al. | |
| 6,654,740 B2 | 11/2003 | Tokuda et al. | |
| 6,665,639 B2 | 12/2003 | Mozer et al. | |
| 6,665,640 B1 | 12/2003 | Bennett et al. | |
| 6,665,641 B1 | 12/2003 | Coorman et al. | |
| 6,684,187 B1 | 1/2004 | Conkie | |
| 6,691,064 B2 | 2/2004 | Vroman | |
| 6,691,111 B2 | 2/2004 | Lazaridis et al. | |
| 6,691,151 B1 | 2/2004 | Cheyer et al. | |
| 6,697,780 B1 | 2/2004 | Beutnagel et al. | |
| 6,697,824 B1 | 2/2004 | Bowman-Amuah | |
| 6,701,294 B1 | 3/2004 | Ball et al. | |
| 6,711,585 B1 | 3/2004 | Copperman et al. | |
| 6,718,324 B2 | 4/2004 | Edlund et al. | |
| 6,721,728 B2 | 4/2004 | McGreevy | |
| 6,735,632 B1 | 5/2004 | Kiraly et al. | |
| 6,742,021 B1 | 5/2004 | Halverson et al. | |
| 6,757,362 B1 | 6/2004 | Cooper et al. | |
| 6,757,718 B1 | 6/2004 | Halverson et al. | |
| 6,766,320 B1 | 7/2004 | Want et al. | |
| 6,778,951 B1 | 8/2004 | Contractor | |
| 6,778,952 B2 | 8/2004 | Bellegarda | |
| 6,778,962 B1 | 8/2004 | Kasai et al. | |

(56) References Cited

U.S. PATENT DOCUMENTS

| | | |
|---|---|---|
| 6,778,970 B2 | 8/2004 | Au |
| 6,792,082 B1 | 9/2004 | Levine |
| 6,807,574 B1 | 10/2004 | Partovi et al. |
| 6,810,379 B1 | 10/2004 | Vermeulen et al. |
| 6,813,491 B1 | 11/2004 | McKinney |
| 6,829,603 B1 | 12/2004 | Chai et al. |
| 6,832,194 B1 | 12/2004 | Mozer et al. |
| 6,839,669 B1 * | 1/2005 | Gould et al. ............... 704/246 |
| 6,842,767 B1 | 1/2005 | Partovi et al. |
| 6,847,966 B1 | 1/2005 | Sommer et al. |
| 6,847,979 B2 | 1/2005 | Allemang et al. |
| 6,851,115 B1 | 2/2005 | Cheyer et al. |
| 6,859,931 B1 | 2/2005 | Cheyer et al. |
| 6,895,380 B2 | 5/2005 | Sepe, Jr. |
| 6,895,558 B1 | 5/2005 | Loveland |
| 6,901,399 B1 | 5/2005 | Corston et al. |
| 6,912,498 B2 * | 6/2005 | Stevens et al. ............... 704/235 |
| 6,912,499 B1 | 6/2005 | Sabourin et al. |
| 6,924,828 B1 | 8/2005 | Hirsch |
| 6,928,614 B1 | 8/2005 | Everhart |
| 6,931,384 B1 | 8/2005 | Horvitz et al. |
| 6,937,975 B1 | 8/2005 | Elworthy |
| 6,937,986 B2 | 8/2005 | Denenberg et al. |
| 6,964,023 B2 | 11/2005 | Maes et al. |
| 6,980,949 B2 | 12/2005 | Ford |
| 6,980,955 B2 | 12/2005 | Okutani et al. |
| 6,985,865 B1 | 1/2006 | Packingham et al. |
| 6,988,071 B1 | 1/2006 | Gazdzinski |
| 6,996,531 B2 | 2/2006 | Korall et al. |
| 6,999,927 B2 | 2/2006 | Mozer et al. |
| 7,020,685 B1 | 3/2006 | Chen et al. |
| 7,027,974 B1 | 4/2006 | Busch et al. |
| 7,036,128 B1 | 4/2006 | Julia et al. |
| 7,050,977 B1 | 5/2006 | Bennett |
| 7,058,569 B2 | 6/2006 | Coorman et al. |
| 7,062,428 B2 | 6/2006 | Hogenhout et al. |
| 7,069,560 B1 | 6/2006 | Cheyer et al. |
| 7,092,887 B2 | 8/2006 | Mozer et al. |
| 7,092,928 B1 | 8/2006 | Elad et al. |
| 7,093,693 B1 | 8/2006 | Gazdzinski |
| 7,127,046 B1 | 10/2006 | Smith et al. |
| 7,127,403 B1 | 10/2006 | Saylor et al. |
| 7,136,710 B1 | 11/2006 | Hoffberg et al. |
| 7,137,126 B1 | 11/2006 | Coffman et al. |
| 7,139,714 B2 | 11/2006 | Bennett et al. |
| 7,139,722 B2 | 11/2006 | Perrella et al. |
| 7,152,070 B1 | 12/2006 | Musick et al. |
| 7,177,798 B2 | 2/2007 | Hsu et al. |
| 7,197,460 B1 | 3/2007 | Gupta et al. |
| 7,200,559 B2 | 4/2007 | Wang |
| 7,203,646 B2 | 4/2007 | Bennett |
| 7,216,073 B2 | 5/2007 | Lavi et al. |
| 7,216,080 B2 | 5/2007 | Tsiao et al. |
| 7,225,125 B2 | 5/2007 | Bennett et al. |
| 7,233,790 B2 | 6/2007 | Kjellberg et al. |
| 7,233,904 B2 | 6/2007 | Luisi |
| 7,266,496 B2 | 9/2007 | Wang et al. |
| 7,277,854 B2 | 10/2007 | Bennett et al. |
| 7,290,039 B1 | 10/2007 | Lisitsa et al. |
| 7,299,033 B2 | 11/2007 | Kjellberg et al. |
| 7,310,600 B1 | 12/2007 | Garner et al. |
| 7,315,818 B2 * | 1/2008 | Stevens et al. ............... 704/235 |
| 7,324,947 B2 | 1/2008 | Jordan et al. |
| 7,349,953 B2 | 3/2008 | Lisitsa et al. |
| 7,376,556 B2 | 5/2008 | Bennett |
| 7,376,645 B2 | 5/2008 | Bernard |
| 7,379,874 B2 | 5/2008 | Schmid et al. |
| 7,386,449 B2 | 6/2008 | Sun et al. |
| 7,389,224 B1 | 6/2008 | Elworthy |
| 7,392,185 B2 | 6/2008 | Bennett |
| 7,398,209 B2 | 7/2008 | Kennewick et al. |
| 7,403,938 B2 | 7/2008 | Harrison et al. |
| 7,409,337 B1 | 8/2008 | Potter et al. |
| 7,415,100 B2 | 8/2008 | Cooper et al. |
| 7,418,392 B1 | 8/2008 | Mozer et al. |
| 7,426,467 B2 | 9/2008 | Nashida et al. |
| 7,427,024 B1 | 9/2008 | Gazdzinski et al. |
| 7,447,635 B1 | 11/2008 | Konopka et al. |
| 7,454,351 B2 | 11/2008 | Jeschke et al. |
| 7,467,087 B1 | 12/2008 | Gillick et al. |
| 7,475,010 B2 | 1/2009 | Chao |
| 7,478,037 B2 | 1/2009 | Strong |
| 7,483,894 B2 | 1/2009 | Cao |
| 7,487,089 B2 | 2/2009 | Mozer |
| 7,496,498 B2 | 2/2009 | Chu et al. |
| 7,496,512 B2 | 2/2009 | Zhao et al. |
| 7,502,738 B2 | 3/2009 | Kennewick et al. |
| 7,508,373 B2 | 3/2009 | Lin et al. |
| 7,522,927 B2 | 4/2009 | Fitch et al. |
| 7,523,108 B2 | 4/2009 | Cao |
| 7,526,466 B2 | 4/2009 | Au |
| 7,529,671 B2 | 5/2009 | Rockenbeck et al. |
| 7,529,676 B2 | 5/2009 | Koyama |
| 7,539,656 B2 | 5/2009 | Fratkina et al. |
| 7,546,382 B2 | 6/2009 | Healey et al. |
| 7,548,895 B2 | 6/2009 | Pulsipher |
| 7,552,055 B2 | 6/2009 | Lecoeuche |
| 7,555,431 B2 | 6/2009 | Bennett |
| 7,558,730 B2 | 7/2009 | Davis et al. |
| 7,571,106 B2 | 8/2009 | Cao et al. |
| 7,599,918 B2 | 10/2009 | Shen et al. |
| 7,620,549 B2 | 11/2009 | Di Cristo et al. |
| 7,624,007 B2 | 11/2009 | Bennett |
| 7,634,409 B2 | 12/2009 | Kennewick et al. |
| 7,636,657 B2 | 12/2009 | Ju et al. |
| 7,640,160 B2 | 12/2009 | Di Cristo et al. |
| 7,647,225 B2 | 1/2010 | Bennett et al. |
| 7,657,424 B2 | 2/2010 | Bennett |
| 7,672,841 B2 | 3/2010 | Bennett |
| 7,676,026 B1 | 3/2010 | Baxter, Jr. |
| 7,684,985 B2 | 3/2010 | Dominach et al. |
| 7,693,715 B2 | 4/2010 | Hwang et al. |
| 7,693,720 B2 | 4/2010 | Kennewick et al. |
| 7,698,131 B2 | 4/2010 | Bennett |
| 7,702,500 B2 | 4/2010 | Blaedow |
| 7,702,508 B2 | 4/2010 | Bennett |
| 7,707,027 B2 | 4/2010 | Balchandran et al. |
| 7,707,032 B2 | 4/2010 | Wang et al. |
| 7,707,267 B2 | 4/2010 | Lisitsa et al. |
| 7,711,565 B1 | 5/2010 | Gazdzinski |
| 7,711,672 B2 | 5/2010 | Au |
| 7,716,056 B2 | 5/2010 | Weng et al. |
| 7,720,674 B2 | 5/2010 | Kaiser et al. |
| 7,720,683 B1 | 5/2010 | Vermeulen et al. |
| 7,725,307 B2 | 5/2010 | Bennett |
| 7,725,318 B2 | 5/2010 | Gavalda et al. |
| 7,725,320 B2 | 5/2010 | Bennett |
| 7,725,321 B2 | 5/2010 | Bennett |
| 7,729,904 B2 | 6/2010 | Bennett |
| 7,729,916 B2 | 6/2010 | Coffman et al. |
| 7,734,461 B2 | 6/2010 | Kwak et al. |
| 7,747,616 B2 | 6/2010 | Yamada et al. |
| 7,752,152 B2 | 7/2010 | Paek et al. |
| 7,756,868 B2 | 7/2010 | Lee |
| 7,774,204 B2 | 8/2010 | Mozer et al. |
| 7,783,486 B2 | 8/2010 | Rosser et al. |
| 7,801,729 B2 | 9/2010 | Mozer |
| 7,809,565 B2 | 10/2010 | Coifman |
| 7,809,570 B2 | 10/2010 | Kennewick et al. |
| 7,809,610 B2 | 10/2010 | Cao |
| 7,818,176 B2 | 10/2010 | Freeman et al. |
| 7,822,608 B2 | 10/2010 | Cross, Jr. et al. |
| 7,826,945 B2 | 11/2010 | Zhang et al. |
| 7,831,426 B2 | 11/2010 | Bennett |
| 7,840,400 B2 | 11/2010 | Lavi et al. |
| 7,840,447 B2 | 11/2010 | Kleinrock et al. |
| 7,853,574 B2 | 12/2010 | Kraenzel et al. |
| 7,873,519 B2 | 1/2011 | Bennett |
| 7,873,654 B2 | 1/2011 | Bernard |
| 7,881,936 B2 | 2/2011 | Longé et al. |
| 7,890,652 B2 | 2/2011 | Bull et al. |
| 7,912,702 B2 | 3/2011 | Bennett |
| 7,917,367 B2 | 3/2011 | Di Cristo et al. |
| 7,917,497 B2 | 3/2011 | Harrison et al. |

(56) References Cited

U.S. PATENT DOCUMENTS

| | | | |
|---|---|---|---|
| 7,920,678 B2 | 4/2011 | Cooper et al. |
| 7,925,525 B2 | 4/2011 | Chin |
| 7,930,168 B2 | 4/2011 | Weng et al. |
| 7,949,529 B2 | 5/2011 | Weider et al. |
| 7,949,534 B2 | 5/2011 | Davis et al. |
| 7,974,844 B2 | 7/2011 | Sumita |
| 7,974,972 B2 | 7/2011 | Cao |
| 7,983,915 B2 | 7/2011 | Knight et al. |
| 7,983,917 B2 | 7/2011 | Kennewick et al. |
| 7,983,997 B2 | 7/2011 | Allen et al. |
| 7,986,431 B2 | 7/2011 | Emori et al. |
| 7,987,151 B2 | 7/2011 | Schott et al. |
| 7,996,228 B2 | 8/2011 | Miller et al. |
| 8,000,453 B2 | 8/2011 | Cooper et al. |
| 8,005,679 B2 | 8/2011 | Jordan et al. |
| 8,015,006 B2 | 9/2011 | Kennewick et al. |
| 8,024,195 B2 | 9/2011 | Mozer et al. |
| 8,036,901 B2 | 10/2011 | Mozer |
| 8,041,570 B2 | 10/2011 | Mirkovic et al. |
| 8,041,611 B2 | 10/2011 | Kleinrock et al. |
| 8,055,708 B2 | 11/2011 | Chitsaz et al. |
| 8,065,155 B1 | 11/2011 | Gazdzinski |
| 8,065,156 B2 | 11/2011 | Gazdzinski |
| 8,069,046 B2 | 11/2011 | Kennewick et al. |
| 8,073,681 B2 | 12/2011 | Baldwin et al. |
| 8,078,473 B1 | 12/2011 | Gazdzinski |
| 8,082,153 B2 | 12/2011 | Coffman et al. |
| 8,095,364 B2 | 1/2012 | Longé et al. |
| 8,099,289 B2 | 1/2012 | Mozer et al. |
| 8,107,401 B2 | 1/2012 | John et al. |
| 8,112,275 B2 | 2/2012 | Kennewick et al. |
| 8,112,280 B2 | 2/2012 | Lu |
| 8,117,037 B2 | 2/2012 | Gazdzinski |
| 8,131,557 B2 | 3/2012 | Davis et al. |
| 8,140,335 B2 | 3/2012 | Kennewick et al. |
| 8,165,886 B1 | 4/2012 | Gagnon et al. |
| 8,166,019 B1 | 4/2012 | Lee et al. |
| 8,190,359 B2 | 5/2012 | Bourne |
| 8,195,467 B2 | 6/2012 | Mozer et al. |
| 8,204,238 B2 | 6/2012 | Mozer |
| 8,205,788 B2 | 6/2012 | Gazdzinski et al. |
| 8,219,407 B1 | 7/2012 | Roy et al. |
| 8,285,551 B2 | 10/2012 | Gazdzinski |
| 8,285,553 B2 | 10/2012 | Gazdzinski |
| 8,290,778 B2 | 10/2012 | Gazdzinski |
| 8,290,781 B2 | 10/2012 | Gazdzinski |
| 8,296,146 B2 | 10/2012 | Gazdzinski |
| 8,296,153 B2 | 10/2012 | Gazdzinski |
| 8,301,456 B2 | 10/2012 | Gazdzinski |
| 8,311,834 B1 | 11/2012 | Gazdzinski |
| 8,370,158 B2 | 2/2013 | Gazdzinski |
| 8,371,503 B2 | 2/2013 | Gazdzinski |
| 8,374,871 B2 | 2/2013 | Ehsani et al. |
| 8,447,612 B2 | 5/2013 | Gazdzinski |
| 2001/0047264 A1 | 11/2001 | Roundtree |
| 2002/0032564 A1 | 3/2002 | Ehsani et al. |
| 2002/0046025 A1 | 4/2002 | Hain |
| 2002/0069063 A1 | 6/2002 | Buchner et al. |
| 2002/0077817 A1 | 6/2002 | Atal |
| 2002/0103641 A1 | 8/2002 | Kuo et al. |
| 2002/0123894 A1 | 9/2002 | Woodward |
| 2002/0138265 A1* | 9/2002 | Stevens et al. ............... 704/251 |
| 2002/0164000 A1 | 11/2002 | Cohen et al. |
| 2002/0198714 A1 | 12/2002 | Zhou |
| 2004/0135701 A1 | 7/2004 | Yasuda et al. |
| 2004/0236778 A1 | 11/2004 | Junqua et al. |
| 2005/0055403 A1 | 3/2005 | Brittan |
| 2005/0071332 A1 | 3/2005 | Ortega et al. |
| 2005/0080625 A1 | 4/2005 | Bennett et al. |
| 2005/0086059 A1* | 4/2005 | Bennett ................... 704/270 |
| 2005/0091118 A1 | 4/2005 | Fano |
| 2005/0102614 A1 | 5/2005 | Brockett et al. |
| 2005/0108001 A1 | 5/2005 | Aarskog |
| 2005/0114124 A1 | 5/2005 | Liu et al. |
| 2005/0119897 A1 | 6/2005 | Bennett et al. |
| 2005/0143972 A1 | 6/2005 | Gopalakrishnan et al. |
| 2005/0165607 A1 | 7/2005 | DiFabbrizio et al. |
| 2005/0182629 A1 | 8/2005 | Coorman et al. |
| 2005/0192801 A1* | 9/2005 | Lewis et al. ............... 704/240 |
| 2005/0196733 A1 | 9/2005 | Budra et al. |
| 2005/0288936 A1 | 12/2005 | Busayapongchai et al. |
| 2006/0018492 A1 | 1/2006 | Chiu et al. |
| 2006/0106592 A1 | 5/2006 | Brockett et al. |
| 2006/0106594 A1 | 5/2006 | Brockett et al. |
| 2006/0106595 A1 | 5/2006 | Brockett et al. |
| 2006/0117002 A1 | 6/2006 | Swen |
| 2006/0122834 A1 | 6/2006 | Bennett |
| 2006/0143007 A1 | 6/2006 | Koh et al. |
| 2006/0293886 A1* | 12/2006 | Odell et al. ............... 704/231 |
| 2007/0038436 A1* | 2/2007 | Cristo et al. ............... 704/9 |
| 2007/0055529 A1 | 3/2007 | Kanevsky et al. |
| 2007/0058832 A1 | 3/2007 | Hug et al. |
| 2007/0088556 A1 | 4/2007 | Andrew |
| 2007/0100790 A1 | 5/2007 | Cheyer et al. |
| 2007/0106674 A1 | 5/2007 | Agrawal et al. |
| 2007/0118377 A1 | 5/2007 | Badino et al. |
| 2007/0135949 A1 | 6/2007 | Snover et al. |
| 2007/0174188 A1 | 7/2007 | Fish |
| 2007/0185917 A1 | 8/2007 | Prahlad et al. |
| 2007/0198269 A1* | 8/2007 | Braho et al. ............... 704/270 |
| 2007/0276651 A1* | 11/2007 | Bliss et al. ............... 704/9 |
| 2007/0282595 A1 | 12/2007 | Tunning et al. |
| 2008/0015864 A1 | 1/2008 | Ross et al. |
| 2008/0021708 A1 | 1/2008 | Bennett et al. |
| 2008/0034032 A1 | 2/2008 | Healey et al. |
| 2008/0052063 A1 | 2/2008 | Bennett et al. |
| 2008/0091426 A1 | 4/2008 | Rempel et al. |
| 2008/0120112 A1 | 5/2008 | Jordan et al. |
| 2008/0126100 A1* | 5/2008 | Grost et al. ............... 704/275 |
| 2008/0129520 A1 | 6/2008 | Lee |
| 2008/0140657 A1 | 6/2008 | Azvine et al. |
| 2008/0221880 A1 | 9/2008 | Cerra et al. |
| 2008/0221903 A1 | 9/2008 | Kanevsky et al. |
| 2008/0228496 A1 | 9/2008 | Yu et al. |
| 2008/0247519 A1 | 10/2008 | Abella et al. |
| 2008/0249770 A1 | 10/2008 | Kim et al. |
| 2008/0300878 A1 | 12/2008 | Bennett |
| 2008/0319763 A1 | 12/2008 | Di Fabbrizio et al. |
| 2009/0006100 A1 | 1/2009 | Badger et al. |
| 2009/0006343 A1 | 1/2009 | Platt et al. |
| 2009/0030800 A1 | 1/2009 | Grois |
| 2009/0055179 A1 | 2/2009 | Cho et al. |
| 2009/0058823 A1 | 3/2009 | Kocienda |
| 2009/0076796 A1 | 3/2009 | Daraselia |
| 2009/0077165 A1 | 3/2009 | Rhodes et al. |
| 2009/0100049 A1 | 4/2009 | Cao |
| 2009/0112677 A1 | 4/2009 | Rhett |
| 2009/0150156 A1 | 6/2009 | Kennewick et al. |
| 2009/0157401 A1 | 6/2009 | Bennett |
| 2009/0164441 A1 | 6/2009 | Cheyer |
| 2009/0171664 A1 | 7/2009 | Kennewick et al. |
| 2009/0287583 A1 | 11/2009 | Holmes |
| 2009/0290718 A1 | 11/2009 | Kahn et al. |
| 2009/0299745 A1 | 12/2009 | Kennewick et al. |
| 2009/0299849 A1 | 12/2009 | Cao et al. |
| 2009/0307162 A1 | 12/2009 | Bui et al. |
| 2010/0005081 A1 | 1/2010 | Bennett |
| 2010/0023320 A1 | 1/2010 | Di Cristo et al. |
| 2010/0036660 A1 | 2/2010 | Bennett |
| 2010/0042400 A1 | 2/2010 | Block et al. |
| 2010/0088020 A1 | 4/2010 | Sano et al. |
| 2010/0138215 A1 | 6/2010 | Williams |
| 2010/0145700 A1 | 6/2010 | Kennewick et al. |
| 2010/0204986 A1 | 8/2010 | Kennewick et al. |
| 2010/0217604 A1 | 8/2010 | Baldwin et al. |
| 2010/0228540 A1 | 9/2010 | Bennett |
| 2010/0235167 A1 | 9/2010 | Bourdon |
| 2010/0235341 A1 | 9/2010 | Bennett |
| 2010/0257160 A1 | 10/2010 | Cao |
| 2010/0262599 A1 | 10/2010 | Nitz |
| 2010/0277579 A1 | 11/2010 | Cho et al. |
| 2010/0280983 A1 | 11/2010 | Cho et al. |
| 2010/0286985 A1 | 11/2010 | Kennewick et al. |
| 2010/0299142 A1 | 11/2010 | Freeman et al. |

(56) References Cited

U.S. PATENT DOCUMENTS

| | | |
|---|---|---|
| 2010/0312547 A1 | 12/2010 | Van Os et al. |
| 2010/0318576 A1 | 12/2010 | Kim |
| 2010/0332235 A1 | 12/2010 | David |
| 2010/0332348 A1 | 12/2010 | Cao |
| 2011/0047072 A1 | 2/2011 | Ciurea |
| 2011/0060807 A1 | 3/2011 | Martin et al. |
| 2011/0082688 A1 | 4/2011 | Kim et al. |
| 2011/0112827 A1 | 5/2011 | Kennewick et al. |
| 2011/0112921 A1 | 5/2011 | Kennewick et al. |
| 2011/0119049 A1 | 5/2011 | Ylonen |
| 2011/0125540 A1 | 5/2011 | Jang et al. |
| 2011/0130958 A1 | 6/2011 | Stahl et al. |
| 2011/0131036 A1 | 6/2011 | Di Cristo et al. |
| 2011/0131045 A1 | 6/2011 | Cristo et al. |
| 2011/0143811 A1 | 6/2011 | Rodriguez |
| 2011/0144999 A1 | 6/2011 | Jang et al. |
| 2011/0161076 A1 | 6/2011 | Davis et al. |
| 2011/0161309 A1 | 6/2011 | Lung et al. |
| 2011/0175810 A1 | 7/2011 | Markovic et al. |
| 2011/0184730 A1 | 7/2011 | LeBeau et al. |
| 2011/0218855 A1 | 9/2011 | Cao et al. |
| 2011/0231182 A1 | 9/2011 | Weider et al. |
| 2011/0231188 A1 | 9/2011 | Kennewick et al. |
| 2011/0264643 A1 | 10/2011 | Cao |
| 2011/0279368 A1 | 11/2011 | Klein et al. |
| 2011/0306426 A1 | 12/2011 | Novak et al. |
| 2012/0002820 A1 | 1/2012 | Leichter |
| 2012/0016678 A1 | 1/2012 | Gruber et al. |
| 2012/0020490 A1 | 1/2012 | Leichter |
| 2012/0022787 A1 | 1/2012 | LeBeau et al. |
| 2012/0022857 A1 | 1/2012 | Baldwin et al. |
| 2012/0022860 A1 | 1/2012 | Lloyd et al. |
| 2012/0022868 A1 | 1/2012 | LeBeau et al. |
| 2012/0022869 A1 | 1/2012 | Lloyd et al. |
| 2012/0022870 A1 | 1/2012 | Kristjansson et al. |
| 2012/0022874 A1 | 1/2012 | Lloyd et al. |
| 2012/0023088 A1 | 1/2012 | Cheng et al. |
| 2012/0034904 A1 | 2/2012 | LeBeau et al. |
| 2012/0035908 A1 | 2/2012 | LeBeau et al. |
| 2012/0035924 A1 | 2/2012 | Jitkoff et al. |
| 2012/0035931 A1 | 2/2012 | LeBeau et al. |
| 2012/0035932 A1 | 2/2012 | Jitkoff et al. |
| 2012/0042343 A1 | 2/2012 | Laligand et al. |
| 2012/0137367 A1 | 5/2012 | Dupont et al. |
| 2012/0173464 A1 | 7/2012 | Tur et al. |
| 2012/0265528 A1 | 10/2012 | Gruber et al. |
| 2012/0271676 A1 | 10/2012 | Aravamudan et al. |
| 2012/0311583 A1 | 12/2012 | Gruber et al. |
| 2013/0110518 A1 | 5/2013 | Gruber et al. |
| 2013/0110520 A1 | 5/2013 | Cheyer et al. |

FOREIGN PATENT DOCUMENTS

| | | |
|---|---|---|
| DE | 198 41 541 B4 | 12/2007 |
| EP | 0138061 B1 | 9/1984 |
| EP | 0138061 A1 | 4/1985 |
| EP | 0218859 A2 | 4/1987 |
| EP | 0262938 A1 | 4/1988 |
| EP | 0293259 A2 | 11/1988 |
| EP | 0299572 A2 | 1/1989 |
| EP | 0313975 A2 | 5/1989 |
| EP | 0314908 A2 | 5/1989 |
| EP | 0327408 A2 | 8/1989 |
| EP | 0389271 A2 | 9/1990 |
| EP | 0411675 A2 | 2/1991 |
| EP | 0559349 A1 | 9/1993 |
| EP | 0559349 B1 | 9/1993 |
| EP | 0570660 A1 | 11/1993 |
| EP | 0863453 A1 | 9/1998 |
| EP | 1245023 A1 | 10/2002 |
| EP | 2 109 295 A1 | 10/2009 |
| GB | 2293667 A | 4/1996 |
| JP | 06 019965 | 1/1994 |
| JP | 2001 125896 | 5/2001 |
| JP | 2002 024212 | 1/2002 |
| JP | 2003517158 A | 5/2003 |
| JP | 2009 036999 | 2/2009 |
| KR | 10-2007-0057496 | 6/2007 |
| KR | 10-0776800 B1 | 11/2007 |
| KR | 10-2008-001227 | 2/2008 |
| KR | 10-0810500 B1 | 3/2008 |
| KR | 10 2008 109322 A | 12/2008 |
| KR | 10 2009 086805 A | 8/2009 |
| KR | 10-0920267 B1 | 10/2009 |
| KR | 10-2010-0032792 | 4/2010 |
| KR | 10 2011 0113414 A | 10/2011 |
| WO | WO 95/02221 | 1/1995 |
| WO | WO 97/26612 | 7/1997 |
| WO | WO 98/41956 | 9/1998 |
| WO | WO 99/01834 | 1/1999 |
| WO | WO 99/08238 | 2/1999 |
| WO | WO 99/56227 | 11/1999 |
| WO | WO 00/60435 | 10/2000 |
| WO | WO 00/60435 A3 | 10/2000 |
| WO | WO 02/073603 A1 | 9/2002 |
| WO | WO 2006/129967 A1 | 12/2006 |
| WO | WO 2008/085742 A2 | 7/2008 |
| WO | WO 2008/109835 A2 | 9/2008 |
| WO | WO 2011/088053 A2 | 7/2011 |

OTHER PUBLICATIONS

Alfred App, 2011, http://www.alfredapp.com/, 5 pages.
Ambite, JL., et al., "Design and Implementation of the CALO Query Manager," Copyright © 2006, American Association for Artificial Intelligence, (www.aaai.org), 8 pages.
Ambite, JL., et al., "Integration of Heterogeneous Knowledge Sources in the CALO Query Manager," 2005, The 4th International Conference on Ontologies, DataBases, and Applications of Semantics (ODBASE), Agia Napa, Cyprus, ttp://www.isi.edu/people/ambite/publications/integration_heterogeneous_knowledge_sources_calo_query_manager, 18 pages.
Belvin, R. et al., "Development of the HRL Route Navigation Dialogue System," 2001, in Proceedings of the First International Conference on Human Language Technology Research, Paper, Copyright © 2001 HRL Laboratories, LLC, http://citeseerx.ist.psu.edu/viewdoc/summary?doi=10.1.1.10.6538, 5 pages.
Berry, P. M., et al. "PTIME: Personalized Assistance for Calendaring," ACM Transactions on Intelligent Systems and Technology, vol. 2, No. 4, Article 40, Publication date: Jul. 2011, 40:1-22, 22 pages.
Butcher, M., "EVI arrives in town to go toe-to-toe with Siri," Jan. 23, 2012, http://techcrunch.com/2012/01/23/evi-arrives-in-town-to-go-toe-to-toe-with-siri/, 2 pages.
Chen, Y., "Multimedia Siri Finds and Plays Whatever You Ask for," Feb. 9, 2012, http://www.psfk.com/2012/02/multimedia-siri.html, 9 pages.
Cheyer, A. et al., "Spoken Language and Multimodal Applications for Electronic Realties," © Springer-Verlag London Ltd, Virtual Reality 1999, 3:1-15, 15 pages.
Cutkosky, M. R. et al., "PACT: An Experiment in Integrating Concurrent Engineering Systems," Journal, Computer, vol. 26 Issue 1, Jan. 1993, IEEE Computer Society Press Los Alamitos, CA, USA, http://dl.acm.org/citation.cfm?id=165320, 14 pages.
Elio, R. et al., "On Abstract Task Models and Conversation Policies," http://webdocs.cs.ualberta.ca/~ree/publications/papers2/ATS.AA99.pdf, 10 pages.
Ericsson, S. et al., "Software illustrating a unified approach to multimodality and multilinguality in the in-home domain," Dec. 22, 2006, Talk and Look: Tools for Ambient Linguistic Knowledge, http://www.talk-project.eurice.eu/fileadmin/talk/publications_public/deliverables_public/D1_6.pdf, 127 pages.
Evi, "Meet Evi: the one mobile app that provides solutions for your everyday problems," Feb. 8, 2012, http://www.evi.com/, 3 pages.
Feigenbaum, E., et al., "Computer-assisted Semantic Annotation of Scientific Life Works," 2007, http://tomgruber.org/writing/stanford-cs300.pdf, 22 pages.
Gannes, L., "Alfred App Gives Personalized Restaurant Recommendations," allthingsd.com, Jul. 18, 2011, http://allthingsd.com/20110718/alfred-app-gives-personalized-restaurant-recommendations/, 3 pages.

(56) References Cited

OTHER PUBLICATIONS

Gautier, P. O., et al. "Generating Explanations of Device Behavior Using Compositional Modeling and Causal Ordering," 1993, http://citeseerx.ist.psu.edu/viewdoc/summary?doi=10.1.1.42.8394, 9 pages.

Gervasio, M. T., et al., Active Preference Learning for Personalized Calendar Scheduling Assistancae, Copyright © 2005, http://www.ai.sri.com/~gervasio/pubs/gervasio-iui05.pdf, 8 pages.

Glass, A., "Explaining Preference Learning," 2006, http://cs229.stanford.edu/proj2006/Glass-ExplainingPreferenceLearning.pdf, 5 pages.

Gruber, T. R., et al., "An Ontology for Engineering Mathematics," in Jon Doyle, Piero Torasso, & Erik Sandewall, Eds., Fourth International Conference on Principles of Knowledge Representation and Reasoning, Gustav Stresemann Institut, Bonn, Germany, Morgan Kaufmann, 1994, http://www-ksl.stanford.edu/knowledge-sharing/papers/engmath.html, 22 pages.

Gruber, T. R., "A Translation Approach to Portable Ontology Specifications," Knowledge Systems Laboratory, Stanford University, Sep. 1992, Technical Report KSL 92-71, Revised Apr. 1993, 27 pages.

Gruber, T. R., "Automated Knowledge Acquisition for Strategic Knowledge," Knowledge Systems Laboratory, Machine Learning, 4, 293-336 (1989), 44 pages.

Gruber, T. R., "(Avoiding) the Travesty of the Commons," Presentation at NPUC 2006, New Paradigms for User Computing, IBM Almaden Research Center, Jul. 24, 2006. http://tomgruber.org/writing/avoiding-travestry.htm, 52 pages.

Gruber, T. R., "Big Think Small Screen: How semantic computing in the cloud will revolutionize the consumer experience on the phone," Keynote presentation at Web 3.0 conference, Jan. 27, 2010, http://tomgruber.org/writing/web30jan2010.htm, 41 pages.

Gruber, T. R., "Collaborating around Shared Content on the WWW," W3C Workshop on WWW and Collaboration, Cambridge, MA, Sep. 11, 1995, http://www.w3.org/Collaboration/Workshop/Proceedings/P9.html, 1 page.

Gruber, T. R., "Collective Knowledge Systems: Where the Social Web meets the Semantic Web," Web Semantics: Science, Services and Agents on the World Wide Web (2007), doi:10.1016/j.websem.2007.11.011, keynote presentation given at the 5th International Semantic Web Conference, Nov. 7, 2006, 19 pages.

Gruber, T. R., "Where the Social Web meets the Semantic Web," Presentation at the 5th International Semantic Web Conference, Nov. 7, 2006, 38 pages.

Gruber, T. R., "Despite our Best Efforts, Ontologies are not the Problem," AAAI Spring Symposium, Mar. 2008, http://tomgruber.org/writing/aaai-ss08.htm, 40 pages.

Gruber, T. R., "Enterprise Collaboration Management with Intraspect," Intraspect Software, Inc., Instraspect Technical White Paper Jul. 2001, 24 pages.

Gruber, T. R., "Every ontology is a treaty—a social agreement—among people with some common motive in sharing," Interview by Dr. Miltiadis D. Lytras, Official Quarterly Bulletin of AIS Special Interest Group on Semantic Web and Information Systems, vol. 1, Issue 3, 2004, http://www.sigsemis.org 1, 5 pages.

Gruber, T. R., et al., "Generative Design Rationale: Beyond the Record and Replay Paradigm," Knowledge Systems Laboratory, Stanford University, Dec. 1991, Technical Report KSL 92-59, Updated Feb. 1993, 24 pages.

Gruber, T. R., "Helping Organizations Collaborate, Communicate, and Learn," Presentation to NASA Ames Research, Mountain View, CA, Mar. 2003, http://tomgruber.org/writing/organizational-intelligence-talk.htm, 30 pages.

Gruber, T. R., "Intelligence at the Interface: Semantic Technology and the Consumer Internet Experience," Presentation at Semantic Technologies conference (SemTech08), May 20, 2008, http://tomgruber.org/writing.htm, 40 pages.

Gruber, T. R., Interactive Acquisition of Justifications: Learning "Why" by Being Told "What" Knowledge Systems Laboratory, Stanford University, Oct. 1990, Technical Report KSL 91-17, Revised Feb. 1991, 24 pages.

Gruber, T. R., "It Is What It Does: The Pragmatics of Ontology for Knowledge Sharing," (c) 2000, 2003, http://www.cidoc-crm.org/docs/symposium_presentations/gruber_cidoc-ontology-2003.pdf, 21 pages.

Gruber, T. R., et al., "Machine-generated Explanations of Engineering Models: A Compositional Modeling Approach," (1993) in Proc. International Joint Conference on Artificial Intelligence, http://citeseerx.ist.psu.edu/viewdoc/summary?doi=10.1.1.34.930, 7 pages.

Gruber, T. R., "2021: Mass Collaboration and the Really New Economy," TNTY Futures, the newsletter of the Next Twenty Years series, vol. 1, Issue 6, Aug. 2001, http://www.tnty.com/newsletter/futures/archive/v01-05business.html, 5 pages.

Gruber, T. R., et al., "NIKE: A National Infrastructure for Knowledge Exchange," Oct. 1994, http://www.eit.com/papers/nike/nike.html and nike.ps, 10 pages.

Gruber, T. R., "Ontologies, Web 2.0 and Beyond," Apr. 24, 2007, Ontology Summit 2007, http://tomgruber.org/writing/ontolog-social-web-keynote.pdf, 17 pages.

Gruber, T. R., "Ontology of Folksonomy: A Mash-up of Apples and Oranges," Originally published to the web in 2005, Int'l Journal on Semantic Web & Information Systems, 3(2), 2007, 7 pages.

Gruber, T. R., "Siri, a Virtual Personal Assistant—Bringing Intelligence to the Interface," Jun. 16, 2009, Keynote presentation at Semantic Technologies conference, Jun. 2009. http://tomgruber.org/writing/semtech09.htm, 22 pages.

Gruber, T. R., "TagOntology," Presentation to Tag Camp, www.tagcamp.org, Oct. 29, 2005, 20 pages.

Gruber, T. R., et al., "Toward a Knowledge Medium for Collaborative Product Development," in Artificial Intelligence in Design 1992, from Proceedings of the Second International Conference on Artificial Intelligence in Design, Pittsburgh, USA, Jun. 22-25, 1992, 19 pages.

Gruber, T. R., "Toward Principles for the Design of Ontologies Used for Knowledge Sharing," in International Journal Human-Computer Studies 43, p. 907-928, substantial revision of paper presented at the International Workshop on Formal Ontology, Mar. 1993, Padova, Italy, available as Technical Report KSL 93-04, Knowledge Systems Laboratory, Stanford University, further revised Aug. 23, 1993, 23 pages.

Guzzoni, D., et al., "Active, A Platform for Building Intelligent Operating Rooms," Surgetica 2007 Computer-Aided Medical Interventions: tools and applications, pp. 191-198, Paris, 2007, Sauramps Médical, http://lsro.epfl.ch/page-68384-en.html, 8 pages.

Guzzoni, D., et al., "Active, A Tool for Building Intelligent User Interfaces," ASC 2007, Palma de Mallorca, http://lsro.epfl.ch/page-34241.html, 6 pages.

Guzzoni, D., et al., "Modeling Human-Agent Interaction with Active Ontologies," 2007, AAAI Spring Symposium, Interaction Challenges for Intelligent Assistants, Stanford University, Palo Alto, California, 8 pages.

Hardawar, D., "Driving app Waze builds its own Siri for hands-free voice control," Feb. 9, 2012, http://venturebeat.com/2012/02/09/driving-app-waze-builds-its-own-siri-for-hands-free-voice-control/, 4 pages.

Intraspect Software, "The Intraspect Knowledge Management Solution: Technical Overview," http://tomgruber.org/writing/intraspect-whitepaper-1998.pdf, 18 pages.

Julia, L., et al., Un éditeur interactif de tableaux dessinés à main levée (An Interactive Editor for Hand-Sketched Tables), Traitement du Signal 1995, vol. 12, No. 6, 8 pages.

Karp, P. D., "A Generic Knowledge-Base Access Protocol," May 12, 1994, http://lecture.cs.buu.ac.th/~f50353/Document/gfp.pdf, 66 pages.

Lemon, O., et al., "Multithreaded Context for Robust Conversational Interfaces: Context-Sensitive Speech Recognition and Interpretation of Corrective Fragments," Sep. 2004, ACM Transactions on Computer-Human Interaction, vol. 11, No. 3, 27 pages.

(56) References Cited

OTHER PUBLICATIONS

Leong, L., et al., "CASIS: A Context-Aware Speech Interface System," IUI'05, Jan. 9-12, 2005, Proceedings of the 10th international conference on Intelligent user interfaces, San Diego, California, USA, 8 pages.
Lieberman, H., et al., "Out of context: Computer systems that adapt to, and learn from, context," 2000, IBM Systems Journal, vol. 39, Nos. 3/4, 2000, 16 pages.
Lin, B., et al., "A Distributed Architecture for Cooperative Spoken Dialogue Agents with Coherent Dialogue State and History," 1999, http://citeseerx.ist.psu.edu/viewdoc/summary?doi=10.1.1.42.272, 4 pages.
McGuire, J., et al., "SHADE: Technology for Knowledge-Based Collaborative Engineering," 1993, Journal of Concurrent Engineering: Applications and Research (CERA), 18 pages.
Milward, D., et al., "D2.2: Dynamic Multimodal Interface Reconfiguration, Talk and Look: Tools for Ambient Linguistic Knowledge," Aug. 8, 2006, http://www.ihmc.us/users/nblaylock/Pubs/Files/talk_d2.2.pdf, 69 pages.
Mitra, P., et al., "A Graph-Oriented Model for Articulation of Ontology Interdependencies," 2000, http://ilpubs.stanford.edu:8090/442/1/2000-20.pdf, 15 pages.
Moran, D. B., et al., "Multimodal User Interfaces in the Open Agent Architecture," Proc. of the 1997 International Conference on Intelligent User Interfaces (IU197), 8 pages.
Mozer, M., "An Intelligent Environment Must be Adaptive," Mar./Apr. 1999, IEEE Intelligent Systems, 3 pages.
Mühlhäuser, M., "Context Aware Voice User Interfaces for Workflow Support," Darmstadt 2007, http://tuprints.ulb.tu-darmstadt.de/876/1/PhD.pdf, 254 pages.
Naone, E., "TR10: Intelligent Software Assistant," Mar.-Apr. 2009, Technology Review, http://www.technologyreview.com/printer_friendly_article.aspx?id=22117, 2 pages.
Neches, R., "Enabling Technology for Knowledge Sharing," Fall 1991, AI Magazine, pp. 37-56, (21 pages).
Nöth, E., et al., "Verbmobil: The Use of Prosody in the Linguistic Components of a Speech Understanding System," IEEE Transactions on Speech and Audio Processing, vol. 8, No. 5, Sep. 2000, 14 pages.
Rice, J., et al., "Monthly Program: Nov. 14, 1995," The San Francisco Bay Area Chapter of ACM SIGCHI, http://www.baychi.org/calendar/19951114/, 2 pages.
Rice, J., et al., "Using the Web Instead of a Window System," Knowledge Systems Laboratory, Stanford University, http://tomgruber.org/writing/ksl-95-69.pdf, 14 pages.
Rivlin, Z., et al., "Maestro: Conductor of Multimedia Analysis Technologies," 1999 SRI International, Communications of the Association for Computing Machinery (CACM), 7 pages.
Sheth, A., et al., "Relationships at the Heart of Semantic Web: Modeling, Discovering, and Exploiting Complex Semantic Relationships," Oct. 13, 2002, Enhancing the Power of the Internet: Studies in Fuzziness and Soft Computing, SpringerVerlag, 38 pages.
Simonite, T., "One Easy Way to Make Siri Smarter," Oct. 18, 2011, Technology Review, http://www.technologyreview.com/printer_friendly_article.aspx?id=38915, 2 pages.
Stent, A., et al., "The CommandTalk Spoken Dialogue System," 1999, http://acl.ldc.upenn.edu/P/P99/P99-1024.pdf, 8 pages.
Tofel, K., et al., "SpeakTolt: A personal assistant for older iPhones, iPads," Feb. 9, 2012, http://gigaom.com/apple/speaktoit-siri-for-older-iphones-ipads/, 7 pages.
Tucker, J., "Too lazy to grab your TV remote? Use Siri instead," Nov. 30, 2011, http://www.engadget.com/2011/11/30/too-lazy-to-grab-your-tv-remote-use-siri-instead/, 8 pages.
Tur, G., et al., "The CALO Meeting Speech Recognition and Understanding System," 2008, Proc. IEEE Spoken Language Technology Workshop, 4 pages.
Tur, G., et al., "The-CALO-Meeting-Assistant System," IEEE Transactions on Audio, Speech, and Language Processing, vol. 18, No. 6, Aug. 2010, 11 pages.
Vlingo, "Vlingo Launches Voice Enablement Application on Apple App Store," Vlingo press release dated Dec. 3, 2008, 2 pages.
YouTube, "Knowledge Navigator," 5:34 minute video uploaded to YouTube by Knownav on Apr. 29, 2008, http://www.youtube.com/watch?v=QRH8eimU_20on Aug. 3, 2006, 1 page.
YouTube, "Send Text, Listen to and Send E-Mail 'By Voice' www.voiceassist.com," 2:11 minute video uploaded to YouTube by VoiceAssist on Jul. 30, 2009, http://www.youtube.com/watch?v=0tEU61nHHA4, 1 page.
YouTube, "Text'nDrive App Demo—Listen and Reply to your Messages by Voice while Driving!," 1:57 minute video uploaded to YouTube by TextnDrive on Apr 27, 2010, http://www.youtube.com/watch?v=WaGfzoHsAMw, 1 page.
YouTube, "Voice on the Go (BlackBerry)," 2:51 minute video uploaded to YouTube by VoiceOnTheGo on Jul. 27, 2009, http://www.youtube.com/watch?v=pJqpWgQS98w, 1 page.
International Search Report and Written Opinion dated Nov. 29, 2011, received in International Application No. PCT/US2011/20861, which corresponds to U.S. Appl. No. 12/987,982, 15 pages. (Thomas Robert Gruber).
Acero, A., et al., "Environmental Robustness in Automatic Speech Recognition," International Conference on Acoustics, Speech, and Signal Processing (ICASSP'90), Apr. 3-6, 1990, 4 pages.
Acero, A., et al., "Robust Speech Recognition by Normalization of the Acoustic Space," International Conference on Acoustics, Speech, and Signal Processing, 1991, 4 pages.
Ahlbom, G., et al., "Modeling Spectral Speech Transitions Using Temporal Decomposition Techniques," IEEE International Conference of Acoustics, Speech, and Signal Processing (ICASSP'87), Apr. 1987, vol. 12, 4 pages.
Aikawa, K., "Speech Recognition Using Time-Warping Neural Networks," Proceedings of the 1991 IEEE Workshop on Neural Networks for Signal Processing, Sep. 30 to Oct. 1, 1991, 10 pages.
Anastasakos, A., et al., "Duration Modeling in Large Vocabulary Speech Recognition," International Conference on Acoustics, Speech, and Signal Processing (ICASSP'95), May 9-12, 1995, 4 pages.
Anderson, R. H., "Syntax-Directed Recognition of Hand-Printed Two-Dimensional Mathematics," in Proceedings of Symposium on Interactive Systems for Experimental Applied Mathematics: Proceedings of the Association for Computing Machinery Inc. Symposium, © 1967, 12 pages.
Ansari, R., et al., "Pitch Modification of Speech using a Low-Sensitivity Inverse Filter Approach," IEEE Signal Processing Letters, vol. 5, No. 3, Mar. 1998, 3 pages.
Anthony, N. J., et al., "Supervised Adaption for Signature Verification System," Jun. 1, 1978, IBM Technical Disclosure, 3 pages.
Apple Computer, "Guide Maker User's Guide," © Apple Computer, Inc., Apr. 27, 1994, 8 pages.
Apple Computer, "Introduction to Apple Guide," © Apple Computer, Inc., Apr. 28, 1994, 20 pages.
Asanović, K., et al., "Experimental Determination of Precision Requirements for Back-Propagation Training of Artificial Neural Networks," in Proceedings of the 2nd International Conference of Microelectronics for Neural Networks, 1991, www.ICSI.Berkeley.EDU, 7 pages.
Atal, B. S., "Efficient Coding of LPC Parameters by Temporal Decomposition," IEEE International Conference on Acoustics, Speech, and Signal Processing (ICASSP'83), Apr. 1983, 4 pages.
Bahl, L. R., et al., "Acoustic Markov Models Used in the Tangora Speech Recognition System," in Proceeding of International Conference on Acoustics, Speech, and Signal Processing (ICASSP'88), Apr. 11-14, 1988, vol. 1, 4 pages.
Bahl, L. R., et al., "A Maximum Likelihood Approach to Continuous Speech Recognition," IEEE Transaction on Pattern Analysis and Machine Intelligence, vol. PAMI-5, No. 2, Mar. 1983, 13 pages.
Bahl, L. R., et al., "A Tree-Based Statistical Language Model for Natural Language Speech Recognition," IEEE Transactions on Acoustics, Speech and Signal Processing, vol. 37, Issue 7, Jul. 1989, 8 pages.
Bahl, L. R., et al., "Large Vocabulary Natural Language Continuous Speech Recognition," in Proceedings of 1989 International Conference on Acoustics, Speech, and Signal Processing, May 23-26, 1989, vol. 1, 6 pages.

(56) References Cited

OTHER PUBLICATIONS

Bahl, L. R., et al, "Multonic Markov Word Models for Large Vocabulary Continuous Speech Recognition," IEEE Transactions on Speech and Audio Processing, vol. 1, No. 3, Jul. 1993, 11 pages.

Bahl, L. R., et al., "Speech Recognition with Continuous-Parameter Hidden Markov Models," in Proceeding of International Conference on Acoustics, Speech, and Signal Processing (ICASSP'88), Apr. 11-14, 1988, vol. 1, 8 pages.

Banbrook, M., "Nonlinear Analysis of Speech from a Synthesis Perspective," A thesis submitted for the degree of Doctor of Philosophy, The University of Edinburgh, Oct. 15, 1996, 35 pages.

Belaid, A., et al., "A Syntactic Approach for Handwritten Mathematical Formula Recognition," IEEE Transactions on Pattern Analysis and Machine Intelligence, vol. PAMI-6, No. 1, Jan. 1984, 7 pages.

Bellegarda, E. J., et al., "On-Line Handwriting Recognition Using Statistical Mixtures," Advances in Handwriting and Drawings: A Multidisciplinary Approach, Europia, 6th International IGS Conference on Handwriting and Drawing, Paris- France, Jul. 1993, 11 pages.

Bellegarda, J. R., "A Latent Semantic Analysis Framework for Large-Span Language Modeling," 5th European Conference on Speech, Communication and Technology, (EUROSPEECH'97), Sep. 22-25, 1997, 4 pages.

Bellegarda, J. R., "A Multispan Language Modeling Framework for Large Vocabulary Speech Recognition," IEEE Transactions on Speech and Audio Processing, vol. 6, No. 5, Sep. 1998, 12 pages.

Bellegarda, J. R., et al., "A Novel Word Clustering Algorithm Based on Latent Semantic Analysis," in Proceedings of the IEEE International Conference on Acoustics, Speech, and Signal Processing (ICASSP'96), vol. 1, 4 pages.

Bellegarda, J. R., et al., "Experiments Using Data Augmentation for Speaker Adaptation," International Conference on Acoustics, Speech, and Signal Processing (ICASSP'95), May 9-12, 1995, 4 pages.

Bellegarda, J. R., "Exploiting Both Local and Global Constraints for Multi-Span Statistical Language Modeling," Proceeding of the 1998 IEEE International Conference on Acoustics, Speech, and Signal Processing (ICASSP'98), vol. 2, May 12-15, 1998, 5 pages.

Bellegarda, J. R., "Exploiting Latent Semantic Information in Statistical Language Modeling," in Proceedings of the IEEE, Aug. 2000, vol. 88, No. 8, 18 pages.

Bellegarda, J. R., "Interaction-Driven Speech Input—A Data-Driven Approach to the Capture of Both Local and Global Language Constraints," 1992, 7 pages, available at http://old.sigchi.org/bulletin/1998.2/bellegarda.html.

Bellegarda, J. R., "Large Vocabulary Speech Recognition with Multispan Statistical Language Models," IEEE Transactions on Speech and Audio Processing, vol. 8, No. 1, Jan. 2000, 9 pages.

Bellegarda, J. R., et al., "Performance of the IBM Large Vocabulary Continuous Speech Recognition System on the ARPA Wall Street Journal Task," Signal Processing VII: Theories and Applications, © 1994 European Association for Signal Processing, 4 pages.

Bellegarda, J. R., et al., "The Metamorphic Algorithm: A Speaker Mapping Approach to Data Augmentation," IEEE Transactions on Speech and Audio Processing, vol. 2, No. 3, Jul. 1994, 8 pages.

Black, A. W., et al., "Automatically Clustering Similar Units for Unit Selection in Speech Synthesis," in Proceedings of Eurospeech 1997, vol. 2, 4 pages.

Blair, D. C., et al., "An Evaluation of Retrieval Effectiveness for a Full-Text Document-Retrieval System," Communications of the ACM, vol. 28, No. 3, Mar. 1985, 11 pages.

Briner, L. L., "Identifying Keywords in Text Data Processing," in Zelkowitz, Marvin V., Ed, Directions and Challenges,l5th Annual Technical Symposium, Jun. 17, 1976, Gaithersbury, Maryland, 7 pages.

Bulyko, I., et al., "Joint Prosody Prediction and Unit Selection for Concatenative Speech Synthesis," Electrical Engineering Department, University of Washington, Seattle, 2001, 4 pages.

Bussey, H. E., et al., "Service Architecture, Prototype Description, and Network Implications of a Personalized Information Grazing Service," INFOCOM'90, Ninth Annual Joint Conference of the IEEE Computer and Communication Societies, Jun. 3-7 1990, http://slrohall.com/publications/, 8 pages.

Buzo, A., et al., "Speech Coding Based Upon Vector Quantization," IEEE Transactions on Acoustics, Speech, and Signal Processing, vol. Assp-28, No. 5, Oct. 1980, 13 pages.

Caminero-Gil, J., et al., "Data-Driven Discourse Modeling for Semantic Interpretation," in Proceedings of the IEEE International Conference on Acoustics, Speech, and Signal Processing, May 7-10, 1996, 6 pages.

Cawley, G. C., "The Application of Neural Networks to Phonetic Modelling," PhD Thesis, University of Essex, Mar. 1996, 13 pages.

Chang, S., et al., "A Segment-based Speech Recognition System for Isolated Mandarin Syllables," Proceedings TENCON '93, IEEE Region 10 conference on Computer, Communication, Control and Power Engineering, Oct. 19-21, 1993, vol. 3, 6 pages.

Conklin, J., "Hypertext: An Introduction and Survey," Computer Magazine, Sep. 1987, 25 pages.

Connolly, F. T., et al., "Fast Algorithms for Complex Matrix Multiplication Using Surrogates," IEEE Transactions on Acoustics, Speech, and Signal Processing, Jun. 1989, vol. 37, No. 6, 13 pages.

Deerwester, S., et al., "Indexing by Latent Semantic Analysis," Journal of the American Society for Information Science, vol. 41, No. 6, Sep. 1990, 19 pages.

Deller, Jr., J. R., et al., "Discrete-Time Processing of Speech Signals," © 1987 Prentice Hall, ISBN: 0-02-328301-7, 14 pages.

Digital Equipment Corporation, "Open VMS Software Overview," Dec. 1995, software manual, 159 pages.

Donovan, R. E., "A New Distance Measure for Costing Spectral Discontinuities in Concatenative Speech Synthesisers," 2001, http://citeseerx.ist.psu.edu/viewdoc/summary?doi=10.1.1.21.6398, 4 pages.

Frisse, M. E., "Searching for Information in a Hypertext Medical Handbook," Communications of the ACM, vol. 31, No. 7, Jul. 1988, 8 pages.

Goldberg, D., et al., "Using Collaborative Filtering to Weave an Information Tapestry," Communications of the ACM, vol. 35, No. 12, Dec. 1992, 10 pages.

Gorin, A. L., et al., "On Adaptive Acquisition of Language," International Conference on Acoustics, Speech, and Signal Processing (ICASSP'90), vol. 1, Apr. 3-6, 1990, 5 pages.

Gotoh, Y., et al., "Document Space Models Using Latent Semantic Analysis," in Proceedings of Eurospeech, 1997, 4 pages.

Gray, R. M., "Vector Quantization," IEEE ASSP Magazine, Apr. 1984, 26 pages.

Harris, F. J., "On the Use of Windows for Harmonic Analysis with the Discrete Fourier Transform," in Proceedings of the IEEE, vol. 66, No. 1, Jan. 1978, 34 pages.

Helm, R., et al., "Building Visual Language Parsers," in Proceedings of CHI'91 Proceedings of the SIGCHI Conference on Human Factors in Computing Systems, 8 pages.

Hermansky, H., "Perceptual Linear Predictive (PLP) Analysis of Speech," Journal of the Acoustical Society of America, vol. 87, No. 4, Apr. 1990, 15 pages.

Hermansky, H., "Recognition of Speech in Additive and Convolutional Noise Based on Rasta Spectral Processing," in proceedings of IEEE International Conference on Acoustics, speech, and Signal Processing (ICASSP'93), Apr. 27-30, 1993, 4 pages.

Hoehfeld M., et al., "Learning with Limited Numerical Precision Using the Cascade-Correlation Algorithm," IEEE Transactions on Neural Networks, vol. 3, No. 4, Jul. 1992, 18 pages.

Holmes, J. N., "Speech Synthesis and Recognition—Stochastic Models for Word Recognition," Speech Synthesis and Recognition, Published by Chapman & Hall, London, ISBN 0 412 53430 4, © 1998 J. N. Holmes, 7 pages.

Hon, H.W., et al., "CMU Robust Vocabulary-Independent Speech Recognition System," IEEE International Conference on Acoustics, Speech, and Signal Processing (ICASSP-91), Apr. 14-17, 1991, 4 pages.

IBM Technical Disclosure Bulletin, "Speech Editor," vol. 29, No. 10, Mar. 10, 1987, 3 pages.

IBM Technical Disclosure Bulletin, "Integrated Audio-Graphics User Interface," vol. 33, No. 11, Apr. 1991, 4 pages.

(56) References Cited

OTHER PUBLICATIONS

IBM Technical Disclosure Bulletin, "Speech Recognition with Hidden Markov Models of Speech Waveforms," vol. 34, No. 1, Jun. 1991, 10 pages.
Iowegian International, "FIR Filter Properties, dspGuro, Digital Signal Processing Central," http://www.dspguru.com/dsp/taqs/fir/properties, downloaded on Jul. 28, 2010, 6 pages.
Jacobs, P. S., et al., "Scisor: Extracting Information from On-Line News," Communications of the ACM, vol. 33, No. 11, Nov. 1990, 10 pages.
Jelinek, F., "Self-Organized Language Modeling for Speech Recognition," Readings in Speech Recognition, edited by Alex Waibel and Kai-Fu Lee, May 15, 1990, © 1990 Morgan Kaufmann Publishers, Inc., ISBN: 1-55860-124-4, 63 pages.
Jennings, A., et al., "A Personal News Service Based on a User Model Neural Network," IEICE Transactions on Information and Systems, vol. E75-D, No. 2, Mar. 1992, Tokyo, JP, 12 pages.
Ji, T., et al., "A Method for Chinese Syllables Recognition based upon Sub-syllable Hidden Markov Model," 1994 International Symposium on Speech, Image Processing and Neural Networks, Apr. 13-16, 1994, Hong Kong, 4 pages.
Jones, J., "Speech Recognition for Cyclone," Apple Computer, Inc., E.R.S., Revision 2.9, Sep. 10, 1992, 93 pages.
Katz, S. M., "Estimation of Probabilities from Sparse Data for the Language Model Component of a Speech Recognizer," IEEE Transactions on Acoustics, Speech, and Signal Processing, vol. ASSP-35, No. 3, Mar. 1987, 3 pages.
Kitano, H., "PhiDM-Dialog, An Experimental Speech-to-Speech Dialog Translation System," Jun. 1991 Computer, vol. 24, No. 6, 13 pages.
Klabbers, E., et al., "Reducing Audible Spectral Discontinuities," IEEE Transactions on Speech and Audio Processing, vol. 9, No. 1, Jan. 2001, 13 pages.
Klatt, D. H., "Linguistic Uses of Segmental Duration in English: Acoustic and Perpetual Evidence," Journal of the Acoustical Society of America, vol. 59, No. 5, May 1976, 16 pages.
Kominek, J., et al., "Impact of Durational Outlier Removal from Unit Selection Catalogs," 5th ISCA Speech Synthesis Workshop, Jun. 14-16, 2004, 6 pages.
Kubala, F., et al., "Speaker Adaptation from a Speaker-Independent Training Corpus," International Conference on Acoustics, Speech, and Signal Processing (ICASSP'90), Apr. 3-6, 1990, 4 pages.
Kubala, F., et al., "The Hub and Spoke Paradigm for CSR Evaluation," Proceedings of the Spoken Language Technology Workshop, Mar. 6-8, 1994, 9 pages.
Lee, K.F., "Large-Vocabulary Speaker-Independent Continuous Speech Recognition: The Sphinx System," Apr. 18, 1988, Partial fulfillment of the requirements for the degree of Doctor of Philosophy, Computer Science Department, Carnegie Mellon University, 195 pages.
Lee, L., et al., "A Real-Time Mandarin Dictation Machine for Chinese Language with Unlimited Texts and Very Large Vocabulary," International Conference on Acoustics, Speech and Signal Processing, vol. 1, Apr. 3-6, 1990, 5 pages.
Lee, L, et al., "Golden Mandarin(II)—An Improved Single-Chip Real-Time Mandarin Dictation Machine for Chinese Language with Very Large Vocabulary," 0-7803-0946-4/93 © 1993IEEE, 4 pages.
Lee, L, et al., "Golden Mandarin(II)—An Intelligent Mandarin Dictation Machine for Chinese Character Input with Adaptation/Learning Functions," International Symposium on Speech, Image Processing and Neural Networks, Apr. 13-16, 1994, Hong Kong, 5 pages.
Lee, L., et al., "System Description of Golden Mandarin (I) Voice Input for Unlimited Chinese Characters," International Conference on Computer Processing of Chinese & Oriental Languages, vol. 5, Nos. 3 & 4, Nov. 1991, 16 pages.
Lin, C.H., et al., "A New Framework for Recognition of Mandarin Syllables With Tones Using Sub-syllabic Unites," IEEE International Conference on Acoustics, Speech, and Signal Processing (ICASSP-93), Apr. 27-30, 1993, 4 pages.

Linde, Y., et al., "An Algorithm for Vector Quantizer Design," IEEE Transactions on Communications, vol. 28, No. 1, Jan. 1980, 12 pages.
Liu, F.H., et al., "Efficient Joint Compensation of Speech for the Effects of Additive Noise and Linear Filtering," IEEE International Conference of Acoustics, Speech, and Signal Processing, ICASSP-92, Mar. 23-26, 1992, 4 pages.
Logan, B., "Mel Frequency Cepstral Coefficients for Music Modeling," in International Symposium on Music Information Retrieval, 2000, 2 pages.
Lowerre, B. T., "The-HARPY Speech Recognition System," Doctoral Dissertation, Department of Computer Science, Carnegie Mellon University, Apr. 1976, 20 pages.
Maghbouleh, A., "An Empirical Comparison of Automatic Decision Tree and Linear Regression Models for Vowel Durations," Revised version of a paper presented at the Computational Phonology in Speech Technology workshop, 1996 annual meeting of the Association for Computational Linguistics in Santa Cruz, California, 7 pages.
Markel, J. D., et al., "Linear Prediction of Speech," Springer-Verlag, Berlin Heidelberg New York 1976, 12 pages.
Morgan, B., "Business Objects," (Business Objects for Windows) Business Objects Inc., DBMS Sep. 1992, vol. 5, No. 10, 3 pages.
Mountford, S. J., et al., "Talking and Listening to Computers," The Art of Human-Computer Interface Design, Copyright © 1990 Apple Computer, Inc. Addison-Wesley Publishing Company, Inc., 17 pages.
Murty, K. S. R., et al., "Combining Evidence from Residual Phase and MFCC Features for Speaker Recognition," IEEE Signal Processing Letters, vol. 13, No. 1, Jan. 2006, 4 pages.
Murveit H. et al., "Integrating Natural Language Constraints into HMM-based Speech Recognition," 1990 International Conference on Acoustics, Speech, and Signal Processing, Apr. 3-6, 1990, 5 pages.
Nakagawa, S., et al., "Speaker Recognition by Combining MFCC and Phase Information," IEEE International Conference on Acoustics Speech and Signal Processing (ICASSP), Mar. 14-19, 2010, 4 pages.
Niesler, T. R., et al., "A Variable-Length Category-Based N-Gram Language Model," IEEE International Conference on Acoustics, Speech, and Signal Processing (ICASSP'96), vol. 1, May 7-10, 1996, 6 pages.
Papadimitriou, C. H., et al., "Latent Semantic Indexing: A Probabilistic Analysis," Nov. 14, 1997, http://citeseerx.ist.psu.edu/messages/downloadsexceeded.html, 21 pages.
Parsons, T. W., "Voice and Speech Processing," Linguistics and Technical Fundamentals, Articulatory Phonetics and Phonemics, © 1987 McGraw-Hill, Inc., ISBN: 0-07-0485541-0, 5 pages.
Parsons, T. W., "Voice and Speech Processing," Pitch and Formant Estimation, © 1987 McGraw-Hill, Inc., ISBN: 0-07-0485541-0, 15 pages.
Picone, J., "Continuous Speech Recognition Using Hidden Markov Models," IEEE ASSP Magazine, vol. 7, No. 3, Jul. 1990, 16 pages.
Rabiner, L. R., et al., "Fundamental of Speech Recognition," © 1993 AT&T, Published by Prentice-Hall, Inc., ISBN: 0-13-285826-6, 17 pages.
Rabiner, L. R., et al., "Note on the Properties of a Vector Quantizer for LPC Coefficients," The Bell System Technical Journal, vol. 62, No. 8, Oct. 1983, 9 pages.
Ratcliffe, M., "ClearAccess 2.0 allows SQL searches off-line," (Structured Query Language), ClearAcess Corp., MacWeek Nov. 16, 1992, vol. 6, No. 41, 2 pages.
Remde, J. R., et al., "SuperBook: An Automatic Tool for Information Exploration-Hypertext?," in Proceedings of Hypertext'87 papers, Nov. 13-15, 1987, 14 pages.
Reynolds, C. F., "On-Line Reviews: A New Application of the HICOM Conferencing System," IEE Colloquium on Human Factors in Electronic Mail and Conferencing Systems, Feb. 3, 1989, 4 pages.
Rigoll, G., "Speaker Adaptation for Large Vocabulary Speech Recognition Systems Using Speaker Markov Models," International Conference on Acoustics, Speech, and Signal Processing (ICASSP'89), May 23-26, 1989, 4 pages.
Riley, M. D., "Tree-Based Modelling of Segmental Durations," Talking Machines Theories, Models, and Designs, 1992 © Elsevier Science Publishers B.V., North-Holland, ISBN: 08-444-89115.3, 15 pages.

(56) References Cited

OTHER PUBLICATIONS

Rivoira, S., et al., "Syntax and Semantics in a Word-Sequence Recognition System," IEEE International Conference on Acoustics, Speech, and Signal Processing (ICASSP'79), Apr. 1979, 5 pages.
Rosenfeld, R., "A Maximum Entropy Approach to Adaptive Statistical Language Modelling," Computer Speech and Language, vol. 10, No. 3, Jul. 1996, 25 pages.
Roszkiewicz, A., "Extending your Apple," Back Talk—Lip Service, A+ Magazine, The Independent Guide for Apple Computing, vol. 2, No. 2, Feb. 1984, 5 pages.
Sakoe, H., et al., "Dynamic Programming Algorithm Optimization for Spoken Word Recognition," IEEE Transactins on Acoustics, Speech, and Signal Processing, Feb. 1978, vol. ASSP-26 No. 1, 8 pages.
Salton, G., et al., "On the Application of Syntactic Methodologies in Automatic Text Analysis," Information Processing and Management, vol. 26, No. 1, Great Britain 1990, 22 pages.
Savoy, J., "Searching Information in Hypertext Systems Using Multiple Sources of Evidence," International Journal of Man-Machine Studies, vol. 38, No. 6, Jun. 1993, 15 pages.
Scagliola, C., "Language Models and Search Algorithms for Real-Time Speech Recognition," International Journal of Man-Machine Studies, vol. 22, No. 5, 1985, 25 pages.
Schmandt, C., et al., "Augmenting a Window System with Speech Input," IEEE Computer Society, Computer Aug. 1990, vol. 23, No. 8, 8 pages.
Schütze, H., "Dimensions of Meaning," Proceedings of Supercomputing'92 Conference, Nov. 16-20, 1992, 10 pages.
Sheth B., et al., "Evolving Agents for Personalized Information Filtering," in Proceedings of the Ninth Conference on Artificial Intelligence for Applications, Mar. 1-5, 1993, 9 pages.
Shikano, K., et al., "Speaker Adaptation Through Vector Quantization," IEEE International Conference on Acoustics, Speech, and Signal Processing (ICASSP'86), vol. 11, Apr. 1986, 4 pages.
Sigurdsson, S., et al., "Mel Frequency Cepstral Coefficients: An Evaluation of Robustness of MP3 Encoded Music," in Proceedings of the 7th International Conference on Music Information Retrieval (ISMIR), 2006, 4 pages.
Silverman, K. E. A., et al., "Using a Sigmoid Transformation for Improved Modeling of Phoneme Duration," Proceedings of the IEEE International Conference on Acoustics, Speech, and Signal Processing, Mar. 15-19, 1999, 5 pages.
Tenenbaum, A.M., et al., "Data Structure Using Pascal," 1981 Prentice-Hall, Inc., 34 pages.
Tsai, W.H., et al., "Attributed Grammar—A Tool for Combining Syntactic and Statistical Approaches to Pattern Recognition," IEEE Transactions on Systems, Man, and Cybernetics, vol. SMC-10, No. 12, Dec. 1980, 13 pages.
Udell, J., "Computer Telephony," Byte, vol. 19, No. 7, Jul. 1, 1994, 9 pages.
van Santen, J. P. H., "Contextual Effects on Vowel Duration," Journal Speech Communication, vol. 11, No. 6, Dec. 1992, 34 pages.
Vepa, J., et al., "New Objective Distance Measures for Spectral Discontinuities in Concatenative Speech Synthesis," in Proceedings of the IEEE 2002 Workshop on Speech Synthesis, 4 pages.
Verschelde, J., "MATLAB Lecture 8. Special Matrices in MATLAB," Nov. 23, 2005, UIC Dept. of Math., Stat.. & C.S., MCS 320, Introduction to Symbolic Computation, 4 pages.
Vingron, M. "Near-Optimal Sequence Alignment," Deutsches Krebsforschungszentrum (DKFZ), Abteilung Theoretische Bioinformatik, Heidelberg, Germany, Jun. 1996, 20 pages.
Werner, S., et al., "Prosodic Aspects of Speech," Université de Lausanne, Switzerland, 1994, Fundamentals of Speech Synthesis and Speech Recognition: Basic Concepts, State of the Art, and Future Challenges, 18 pages.
Wikipedia, "Mel Scale," Wikipedia, the free encyclopedia, http://en.wikipedia.org/wiki/Mel_scale, 2 pages.
Wikipedia, "Minimum Phase," Wikipedia, the free encyclopedia, http://en.wikipedia.org/wiki/Minimum_phase, 8 pages.

Wolff, M., "Poststructuralism and the Artful Database: Some Theoretical Considerations," Information Technology and Libraries, vol. 13, No. 1, Mar. 1994, 10 pages.
Wu, M., "Digital Speech Processing and Coding," ENEE408G Capstone—Multimedia Signal Processing, Spring 2003, Lecture-2 course presentation, University of Maryland, College Park, 8 pages.
Wu, M., "Speech Recognition, Synthesis, and H.C.I.," ENEE408G Capstone-Multimedia Signal Processing, Spring 2003, Lecture-3 course presentation, University of Maryland, College Park, 11 pages.
Wyle, M. F., "A Wide Area Network Information Filter," in Proceedings of First International Conference on Artificial Intelligence on Wall Street, Oct. 9-11, 1991, 6 pages.
Yankelovich, N., et al., "Intermedia: The Concept and the Construction of a Seamless Information Environment," Computer Magazine, Jan. 1988, © 1988 IEEE, 16 pages.
Yoon, K., et al., "Letter-to-Sound Rules for Korean," Department of Linguistics, The Ohio State University, 2002, 4 pages.
Zhao, Y., "An Acoustic-Phonetic-Based Speaker Adaptation Technique for Improving Speaker-Independent Continuous Speech Recognition," IEEE Transactions on Speech and Audio Processing, vol. 2, No. 3, Jul. 1994, 15 pages.
Zovato, E., et al., "Towards Emotional Speech Synthesis: A Rule Based Approach," 2 pages.
International Search Report dated Nov. 9, 1994, received in International Application No. PCT/US1993/12666, which corresponds to U.S. Appl. No. 07/999,302, 8 pages. (Robert Don Strong).
International Preliminary Examination Report dated Mar. 1, 1995, received in International Application No. PCT/US1993/12666, which corresponds to U.S. Appl. No. 07/999,302, 5 pages. (Robert Don Strong).
International Preliminary Examination Report dated Apr. 10, 1995, received in International Application No. PCT/US1993/12637, which corresponds to U.S. Appl. No. 07/999,354, 7 pages. (Alejandro Acero).
International Search Report dated Feb. 8, 1995, received in International Application No. PCT/US1994/11011, which corresponds to U.S. Appl. No. 08/129,679, 7 pages. (Yen-Lu Chow).
International Preliminary Examination Report dated Feb. 28, 1996, received in International Application No. PCT/US1994/11011, which corresponds to U.S. Appl. No. 08/129,679, 4 pages. (Yen-Lu Chow).
Written Opinion dated Aug. 21, 1995, received in International Application No. PCT/US1994/11011, which corresponds to U.S. Appl. No. 08/129,679, 4 pages. (Yen-Lu Chow).
International Search Report dated Nov. 8, 1995, received in International Application No. PCT/US1995/08369, which corresponds to U.S. Appl. No. 08/271,639, 6 pages. (Peter V. De Souza).
International Preliminary Examination Report dated Oct. 9, 1996, received in International Application No. PCT/US1995/08369, which corresponds to U.S. Appl. No. 08/271,639, 4 pages. (Peter V. De Souza).
Glass, J., et al., "Multilingual Spoken-Language Understanding in the MIT Voyager System," Aug. 1995, http://groups.csail.mit.edu/sls/publications/1995/speechcomm95-voyager.pdf, 29 pages.
Goddeau, D., et al., "A Form-Based Dialogue Manager for Spoken Language Applications," Oct. 1996, http://phasedance.com/pdf/icslp96.pdf, 4 pages.
Goddeau, D., et al., "Galaxy: A Human-Language Interface to On-Line Travel Information," 1994 International Conference on Spoken Language Processing, Sep. 18-22, 1994, Pacific Convention Plaza Yokohama, Japan, 6 pages.
Meng, H., et al., "Wheels: A Conversational System in the Automobile Classified Domain," Oct. 1996, httphttp://citeseerx.ist.psu.edu/viewdoc/summary?doi=10.1.1.16.3022, 4 pages.
*Phoenix Solutions, Inc. v. West Interactive Corp.*, Document 40, Declaration of Christopher Schmandt Regarding the MIT Galaxy System dated Jul. 2, 2010, 162 pages.
Seneff, S., et al., "A New Restaurant Guide Conversational System: Issues in Rapid Prototyping for Specialized Domains," Oct. 1996, citeseerx.ist.psu.edu/viewdoc/download?doi=10.1.1.16...rep . . . , 4 pages.

(56) References Cited

OTHER PUBLICATIONS

Vlingo InCar, "Distracted Driving Solution with Vlingo InCar," 2:38 minute video uploaded to YouTube by Vlingo Voice on Oct. 6, 2010, http://www.youtube.com/watch?v=Vqs8XfXxgz4, 2 pages.
Zue, V., "Conversational Interfaces: Advances and Challenges," Sep. 1997, http://www.cs.cmu.edu/~dod/papers/zue97.pdf, 10 pages.
Zue, V. W., "Toward Systems that Understand Spoken Language," Feb. 1994, ARPA Strategic Computing Institute, © 1994 IEEE, 9 pages.
"Acoustic Model", from Wikipedia, http://en.wikipedia.org/wiki/Acoustic_Model, downloaded Sep. 14, 2011, 2 pages.
"Language Model", from Wikipedia, http://en.wikipedia.org/wiki/Language_model, downloaded Sep. 14, 2011, 3 pages.
"Speech recognition", from Wikipedia, http://en.wikipedia.org/wiki/Speech_recognition, downloaded Sep. 14, 2011, 10 pages.
Agnäs, MS., et al., "Spoken Language Translator: First-Year Report," Jan. 1994, SICS (ISSN 0283-3638), SRI and Telia Research AB, 161 pages.
Allen, J., "Natural Language Understanding," 2nd Edition, Copyright © 1995 by The Benjamin/Cummings Publishing Company, Inc., 671 pages.
Alshawi, H., et al., "CLARE: A Contextual Reasoning and Cooperative Response Framework for the Core Language Engine," Dec. 1992, SRI International, Cambridge Computer Science Research Centre, Cambridge, 273 pages.
Alshawi, H., et al., "Declarative Derivation of Database Queries from Meaning Representations," Oct. 1991, Proceedings of the Bankai Workshop on Intelligent Information Access, 12 pages.
Alshawi H., et al., "Logical Forms in the Core Language Engine," 1989, Proceedings of the 27th Annual Meeting of the Association for Computational Linguistics, 8 pages.
Alshawi, H., et al., "Overview of the Core Language Engine," Sep. 1988, Proceedings of Future Generation Computing Systems, Tokyo, 13 pages.
Alshawi, H., "Translation and Monotonic Interpretation/Generation," Jul. 1992, SRI International, Cambridge Computer Science Research Centre, Cambridge, 18 pages, http://www.cam.sri.com/tr/crc024/paper.ps.Z_1992.
Appelt, D., et al., "Fastus: A Finite-state Processor for Information Extraction from Real-world Text," 1993, Proceedings of IJCAI, 8 pages.
Appelt, D., et al., "SRI: Description of the JV-FASTUS System Used for MUC-5," 1993, SRI International, Artificial Intelligence Center, 19 pages.
Appelt, D., et al., SRI International Fastus System MUC-6 Test Results and Analysis, 1995, SRI International, Menlo Park, California, 12 pages.
Archbold, A., et al., "A Team User's Guide," Dec. 21, 1981, SRI International, 70 pages.
Bear, J., et al., "A System for Labeling Self-Repairs in Speech," Feb. 22, 1993, SRI International, 9 pages.
Bear, J., et al., "Detection and Correction of Repairs in Human-Computer Dialog," May 5, 1992, SRI International, 11 pages.
Bear, J., et al., "Integrating Multiple Knowledge Sources for Detection and Correction of Repairs in Human-Computer Dialog," 1992, Proceedings of the 30th annual meeting on Association for Computational Linguistics (ACL), 8 pages.
Bear, J., et al., "Using Information Extraction to Improve Document Retrieval," 1998, SRI International, Menlo Park, California, 11 pages.
Berry, P., et al., "Task Management under Change and Uncertainty Constraint Solving Experience with the CALO Project," 2005, Proceedings of CP'05 Workshop on Constraint Solving under Change, 5 pages.
Bobrow, R. et al., "Knowledge Representation for Syntactic/Semantic Processing," From: AAA-80 Proceedings. Copyright © 1980, AAAI, 8 pages.
Bouchou, B., et al., "Using Transducers in Natural Language Database Query," Jun. 17-19, 1999, Proceedings of 4th International Conference on Applications of Natural Language to Information Systems, Austria, 17 pages.
Bratt, H., et al., "The SRI Telephone-based ATIS System," 1995, Proceedings of ARPA Workshop on Spoken Language Technology, 3 pages.
Bulyko, I. et al., "Error-Correction Detection and Response Generation in a Spoken Dialogue System," © 2004 Elsevier B.V., specom. 2004.09.009, 18 pages.
Burke, R., et al., "Question Answering from Frequently Asked Question Files," 1997, AI Magazine, vol. 18, No. 2, 10 pages.
Burns, A., et al., "Development of a Web-Based Intelligent Agent for the Fashion Selection and Purchasing Process via Electronic Commerce," Dec. 31, 1998, Proceedings of the Americas Conference on Information system (AMCIS), 4 pages.
Carter, D., "Lexical Acquisition in the Core Language Engine," 1989, Proceedings of the Fourth Conference of the European Chapter of the Association for Computational Linguistics, 8 pages.
Carter, D., et al., "The Speech-Language Interface in the Spoken Language Translator," Nov. 23, 1994, SRI International, 9 pages.
Chai, J., et al., "Comparative Evaluation of a Natural Language Dialog Based System and a Menu Driven System for Information Access: a Case Study," Apr. 2000, Proceedings of the International Conference on Multimedia Information Retrieval (RIAO), Paris, 11 pages.
Cheyer, A., et al., "Multimodal Maps: An Agent-based Approach," International Conference on Cooperative Multimodal Communication, 1995, 15 pages.
Cheyer, A., et al., "The Open Agent Architecture," Autonomous Agents and Multi-Agent systems, vol. 4, Mar. 1, 2001, 6 pages.
Cheyer, A., et al., "The Open Agent Architecture: Building communities of distributed software agents" Feb. 21, 1998, Artificial Intelligence Center SRI International, Power Point presentation, downloaded from http://www.ai.sri.com/~oaa/, 25 pages.
Codd, E. F., "Databases: Improving Usability and Responsiveness—'How About Recently'," Copyright © 1978, by Academic Press, Inc., 28 pages.
Cohen, P.R., et al., "An Open Agent Architecture," 1994, 8 pages. http://citeseerx.ist.psu.edu/viewdoc/summary?doi=10.1.1.30.480.
Coles, L. S., et al., "Chemistry Question-Answering," Jun. 1969, SRI International, 15 pages.
Coles, L. S., "Techniques for Information Retrieval Using an Inferential Question-Answering System with Natural-Language Input," Nov. 1972, SRI International, 198 pages.
Coles, L. S., "The Application of Theorem Proving to Information Retrieval," Jan. 1971, SRI International, 21 pages.
Constantinides, P., et al., "A Schema Based Approach to Dialog Control," 1998, Proceedings of the International Conference on Spoken Language Processing, 4 pages.
Cox, R. V., et al., "Speech and Language Processing for Next-Millennium Communications Services," Proceedings of the IEEE, vol. 88, No. 8, Aug. 2000, 24 pages.
Craig, J., et al., "Deacon: Direct English Access and Control," Nov. 7-10, 1966 AFIPS Conference Proceedings, vol. 19, San Francisco, 18 pages.
Dar, S., et al., "DTL's DataSpot: Database Exploration Using Plain Language," 1998 Proceedings of the 24th VLDB Conference, New York, 5 pages.
Davis, Z., et al., "A Personal Handheld Multi-Modal Shopping Assistant," 2006 IEEE, 9 pages.
Decker, K., et al., "Designing Behaviors for Information Agents," The Robotics Institute, Carnegie-Mellon University, paper, Jul. 6, 1996, 15 pages.
Decker, K., et al., "Matchmaking and Brokering," The Robotics Institute, Carnegie-Mellon University, paper, May 16, 1996, 19 pages.
Dowding, J., et al., "Gemini: A Natural Language System for Spoken-Language Understanding, 1993, Proceedings of the Thirty-First Annual Meeting of the Association for Computational Linguistics," 8 pages.

(56) References Cited

OTHER PUBLICATIONS

Dowding, J., et al., "Interleaving Syntax and Semantics in an Efficient Bottom-Up Parser," 1994, Proceedings of the 32nd Annual Meeting of the Association for Computational Linguistics, 7 pages.
Epstein, M., et al., "Natural Language Access to a Melanoma Data Base," Sep. 1978, SRI International, 7 pages.
Exhibit 1, "Natural Language Interface Using Constrained Intermediate Dictionary of Results," Classes/Subclasses Manually Reviewed for the Search of US Patent No. 7,177,798, Mar. 22, 2013, 1 page.
Exhibit 1, "Natural Language Interface Using Constrained Intermediate Dictionary of Results," List of Publications Manually reviewed for the Search of US Patent No. 7,177,798, Mar. 22, 2013, 1 page.
Ferguson, G., et al., "TRIPS: An Integrated Intelligent Problem-Solving Assistant," 1998, Proceedings of the Fifteenth National Conference on Artificial Intelligence (AAAI-98) and Tenth Conference on Innovative Applications of Artificial Intelligence (IAAI-98), 7 pages.
Fikes, R., et al., "A Network-based knowledge Representation and its Natural Deduction System," Jul. 1977, SRI International, 43 pages.
Gambäck, B., et al., "The Swedish Core Language Engine," 1992 NOTEX Conference, 17 pages.
Glass, J., et al., "Multilingual Language Generation Across Multiple Domains," Sep. 18-22, 1994, International Conference on Spoken Language Processing, Japan, 5 pages.
Green, C. "The Application of Theorem Proving to Question-Answering Systems," Jun. 1969, SRI Stanford Research Institute, Artificial Intelligence Group, 169 pages.
Gregg, D. G., "DSS Access on the WWW: An Intelligent Agent Prototype," 1998 Proceedings of the Americas Conference on Information Systems-Association for Information Systems, 3 pages.
Grishman, R., "Computational Linguistics: An Introduction," © Cambridge University Press 1986, 172 pages.
Grosz, B. et al., "Dialogic: A Core Natural-Language Processing System," Nov. 9, 1982, SRI International, 17 pages.
Grosz, B. et al., "Research on Natural-Language Processing at SRI," Nov. 1981, SRI International, 21 pages.
Grosz, B., et al., "TEAM: An Experiment in the Design of Transportable Natural-Language Interfaces," Artificial Intelligence, vol. 32, 1987, 71 pages.
Grosz, B., "Team: A Transportable Natural-Language Interface System," 1983, Proceedings of the First Conference on Applied Natural Language Processing, 7 pages.
Guida, G., et al., "NLI: A Robust Interface for Natural Language Person-Machine Communication," Int. J. Man-Machine Studies, vol. 17, 1982, 17 pages.
Guzzoni, D., et al., "Active, A platform for Building Intelligent Software," Computational Intelligence 2006, 5 pages. http://www.informatik.uni-trier.de/~ley/pers/hd/g/Guzzoni:Didier.
Guzzoni, D., "Active: A unified platform for building intelligent assistant applications," Oct. 25, 2007, 262 pages.
Guzzoni, D., et al., "Many Robots Make Short Work," 1996 AAAI Robot Contest, SRI International, 9 pages.
Haas, N., et al., "An Approach to Acquiring and Applying Knowledge," Nov. 1980, SRI International, 22 pages.
Hadidi, R., et al., "Students' Acceptance of Web-Based Course Offerings: An Empirical Assessment," 1998 Proceedings of the Americas Conference on Information Systems (AMCIS), 4 pages.
Hawkins, J., et al., "Hierarchical Temporal Memory: Concepts, Theory, and Terminology," Mar. 27, 2007, Numenta, Inc., 20 pages.
He, Q., et al., "Personal Security Agent: KQML-Based PKI," The Robotics Institute, Carnegie-Mellon University, paper, Oct. 1, 1997, 14 pages.
Hendrix, G. et al., "Developing a Natural Language Interface to Complex Data," ACM Transactions on Database Systems, vol. 3, No. 2, Jun. 1978, 43 pages.
Hendrix, G., "Human Engineering for Applied Natural Language Processing," Feb. 1977, SRI International, 27 pages.
Hendrix, G., "Klaus: A System for Managing Information and Computational Resources," Oct. 1980, SRI International, 34 pages.
Hendrix, G., "Lifer: A Natural Language Interface Facility," Dec. 1976, SRI Stanford Research Institute, Artificial Intelligence Center, 9 pages.
Hendrix, G., "Natural-Language Interface," Apr.-Jun. 1982, American Journal of Computational Linguistics, vol. 8, No. 2, 7 pages.
Hendrix, G., "The Lifer Manual: A Guide to Building Practical Natural Language Interfaces," Feb. 1977, SRI International, 76 pages.
Hendrix, G., et al., "Transportable Natural-Language Interfaces to Databases," Apr. 30, 1981, SRI International, 18 pages.
Hirschman, L., et al., "Multi-Site Data Collection and Evaluation in Spoken Language Understanding," 1993, Proceedings of the workshop on Human Language Technology, 6 pages.
Hobbs, J., et al., "Fastus: A System for Extracting Information from Natural-Language Text," Nov. 19, 1992, SRI International, Artificial Intelligence Center, 26 pages.
Hobbs, J., et al.,"Fastus: Extracting Information from Natural-Language Texts," 1992, SRI International, Artificial Intelligence Center, 22 pages.
Hobbs, J., "Sublanguage and Knowledge," Jun. 1984, SRI International, Artificial Intelligence Center, 30 pages.
Hodjat, B., et al., "Iterative Statistical Language Model Generation for Use with an Agent-Oriented Natural Language Interface," vol. 4 of the Proceedings of HCI International 2003, 7 pages.
Huang, X., et al., "The SPHINX-II Speech Recognition System: An Overview," Jan. 15, 1992, Computer, Speech and Language, 14 pages.
Issar, S., et al., "CMU's Robust Spoken Language Understanding System," 1993, Proceedings of Eurospeech, 4 pages.
Issar, S., "Estimation of Language Models for New Spoken Language Applications," Oct. 3-6, 1996, Proceedings of 4th International Conference on Spoken language Processing, Philadelphia, 4 pages.
Janas, J., "The Semantics-Based Natural Language Interface to Relational Databases," © Springer-Verlag Berlin Heidelberg 1986, Germany, 48 pages.
Johnson, J., "A Data Management Strategy for Transportable Natural Language Interfaces," Jun. 1989, doctoral thesis submitted to the Department of Computer Science, University of British Columbia, Canada, 285 pages.
Julia, L., et al., "http://www.speech.sri.com/demos/atis.html," 1997, Proceedings of AAAI, Spring Symposium, 5 pages.
Kahn, M., et al., "CoABS Grid Scalability Experiments," 2003, Autonomous Agents and Multi-Agent Systems, vol. 7, 8 pages.
Kamel, M., et al., "A Graph Based Knowledge Retrieval System," © 1990 IEEE, 7 pages.
Katz, B., "Annotating the World Wide Web Using Natural Language," 1997, Proceedings of the 5th RIAO Conference on Computer Assisted Information Searching on the Internet, 7 pages.
Katz, B., "A Three-Step Procedure for Language Generation," Dec. 1980, Massachusetts Institute of Technology, Artificial Intelligence Laboratory, 42 pages.
Katz, B., et al., "Exploiting Lexical Regularities in Designing Natural Language Systems," 1988, Proceedings of the 12th International Conference on Computational Linguistics, Coling'88, Budapest, Hungary, 22 pages.
Katz, B., et al., "REXTOR: A System for Generating Relations from Natural Language," in Proceedings of the ACL Oct. 2000 Workshop on Natural Language Processing and Information Retrieval (NLP &IR), 11 pages.
Katz, B., "Using English for Indexing and Retrieving," 1988 Proceedings of the 1st RIAO Conference on User-Oriented Content-Based Text and Image (RIAO'88), 19 pages.
Konolige, K., "A Framework for a Portable Natural-Language Interface to Large Data Bases," Oct. 12, 1979, SRI International, Artificial Intelligence Center, 54 pages.
Laird, J., et al., "SOAR: An Architecture for General Intelligence," 1987, Artificial Intelligence vol. 33, 64 pages.
Langly, P., et al.,"A Design for the Icarus Architechture," SIGART Bulletin, vol. 2, No. 4, 6 pages.
Larks, "Intelligent Software Agents: Larks," 2006, downloaded on Mar. 15, 2013 from http://www.cs.cmu.edu/larks.html, 2 pages.
Martin, D., et al., "Building Distributed Software Systems with the Open Agent Architecture," Mar. 23-25, 1998, Proceedings of the

(56) References Cited

OTHER PUBLICATIONS

Third International Conference on the Practical Application of Intelligent Agents and Multi-Agent Technology, 23 pages.
Martin, D., et al., "Development Tools for the Open Agent Architecture," Apr. 1996, Proceedings of the International Conference on the Practical Application of Intelligent Agents and Multi-Agent Technology, 17 pages.
Martin, D., et al., "Information Brokering in an Agent Architecture," Apr. 1997, Proceedings of the second International Conference on the Practical Application of Intelligent Agents and Multi-Agent Technology, 20 pages.
Martin, D., et al., "PAAM '98 Tutorial: Building and Using Practical Agent Applications," 1998, SRI International, 78 pages.
Martin, P., et al., "Transportability and Generality in a Natural-Language Interface System," Aug. 8-12, 1983, Proceedings of the Eight International Joint Conference on Artificial Intelligence, West Germany, 21 pages.
Matiasek, J., et al., "Tamic-P: A System for NL Access to Social Insurance Database," Jun. 17-19, 1999, Proceeding of the 4th International Conference on Applications of Natural Language to Information Systems, Austria, 7 pages.
Michos, S.E., et al., "Towards an adaptive natural language interface to command languages," Natural Language Engineering 2 (3), © 1994 Cambridge University Press, 19 pages.
Milstead, J., et al., "Metadata: Cataloging by Any Other Name . . . " Jan. 1999, Online, Copyright © 1999 Information Today, Inc., 18 pages.
Minker, W., et al., "Hidden Understanding Models for Machine Translation," 1999, Proceedings of ETRW on Interactive Dialogue in Multi-Modal Systems, 4 pages.
Modi, P. J., et al., "CMRadar: A Personal Assistant Agent for Calendar Management," © 2004, American Association for Artificial Intelligence, Intelligent Systems Demonstrations, 2 pages.
Moore, R., et al., "Combining Linguistic and Statistical Knowledge Sources in Natural-Language Processing for ATIS," 1995, SRI International, Artificial Intelligence Center, 4 pages.
Moore, R., "Handling Complex Queries in a Distributed Data Base," Oct. 8, 1979, SRI International, Artificial Intelligence Center, 38 pages.
Moore, R., "Practical Natural-Language Processing by Computer," Oct. 1981, SRI International, Artificial Intelligence Center, 34 pages.
Moore, R., et al., "SRI's Experience with the ATIS Evaluation," Jun. 24-27, 1990, Proceedings of a workshop held at Hidden Valley, Pennsylvania, 4 pages.
Moore, et al., "The Information Warefare Advisor: An Architecture for Interacting with Intelligent Agents Across the Web," Dec. 31, 1998 Proceedings of Americas Conference on Information Systems (AMCIS), 4 pages.
Moore, R., "The Role of Logic in Knowledge Representation and Commonsense Reasoning," Jun. 1982, SRI International, Artificial Intelligence Center, 19 pages.
Moore, R., "Using Natural-Language Knowledge Sources in Speech Recognition," Jan. 1999, SRI International, Artificial Intelligence Center, 24 pages.
Moran, D., et al., "Intelligent Agent-based User Interfaces," Oct. 12-13, 1995, Proceedings of International Workshop on Human Interface Technology, University of Aizu, Japan, 4 pages. http://www.dougmoran.com/dmoran/PAPERS/oaa-iwhit1995.pdf.
Moran, D., "Quantifier Scoping in the SRI Core Language Engine," 1988, Proceedings of the 26th annual meeting on Association for Computational Linguistics, 8 pages.
Motro, A., "Flex: A Tolerant and Cooperative User Interface to Databases," IEEE Transactions on Knowledge and Data Engineering, vol. 2, No. 2, Jun. 1990, 16 pages.
Murveit, H., et al., "Speech Recognition in SRI's Resource Management and ATIS Systems," 1991, Proceedings of the workshop on Speech and Natural Language (HTL'91), 7 pages.
OAA, "The Open Agent Architecture 1.0 Distribution Source Code," Copyright 1999, SRI International, 2 pages.

Odubiyi, J., et al., "SAIRE—a scalable agent-based information retrieval engine," 1997 Proceedings of the First International Conference on Autonomous Agents, 12 pages.
Owei, V., et al., "Natural Language Query Filtration in the Conceptual Query Language," © 1997 IEEE, 11 pages.
Pannu, A., et al., "A Learning Personal Agent for Text Filtering and Notification," 1996, The Robotics Institute School of Computer Science, Carnegie-Mellon University, 12 pages.
Pereira, "Logic for Natural Language Analysis," Jan. 1983, SRI International, Artificial Intelligence Center, 194 pages.
Perrault, C.R., et al., "Natural-Language Interfaces," Aug. 22, 1986, SRI International, 48 pages.
Pulman, S.G., et al., "Clare: A Combined Language and Reasoning Engine," 1993, Proceedings of JFIT Conference, 8 pages. URL: http://www.cam.sri.com/tr/crc042/paper.ps.Z.
Ravishankar, "Efficient Algorithms for Speech Recognition," May 15, 1996, Doctoral Thesis submitted to School of Computer Science, Computer Science Division, Carnegie Mellon University, Pittsburg, 146 pages.
Rayner, M., et al., "Adapting the Core Language Engine to French and Spanish," May 10, 1996, Cornell University Library, 9 pages. http://arxiv.org/abs/cmp-lg/9605015.
Rayner, M., "Abductive Equivalential Translation and its application to Natural Language Database Interfacing," Sep. 1993 Dissertation paper, SRI International, 163 pages.
Rayner, M., et al., "Deriving Database Queries from Logical Forms by Abductive Definition Expansion," 1992, Proceedings of the Third Conference on Applied Natural Language Processing, ANLC'92, 8 pages.
Rayner, M., "Linguistic Domain Theories: Natural-Language Database Interfacing from First Principles," 1993, SRI International, Cambridge, 11 pages.
Rayner, M., et al., "Spoken Language Translation With Mid-90's Technology: A Case Study," 1993, Eurospeech, ISCA, 4 pages. http://dblp.uni-trier.de/db/conf/interspeech/eurospeech1993.html#RaynerBCCDGKKLPPS93.
Rudnicky, A.I., et al., "Creating Natural Dialogs in the Carnegie Mellon Communicator System."
Russell, S., et al., "Artificial Intelligence, A Modern Approach," © 1995 Prentice Hall, Inc., 121 pages.
Sacerdoti, E., et al., "A Ladder User's Guide (Revised)," Mar. 1980, SRI International, Artificial Intelligence Center, 39 pages.
Sagalowicz, D., "A D-Ladder User's Guide," Sep. 1980, SRI International, 42 pages.
Sameshima, Y., et al., "Authorization with security attributes and privilege delegation Access control beyond the ACL," Computer Communications, vol. 20, 1997, 9 pages.
San-Segundo, R., et al., "Confidence Measures for Dialogue Management in the CU Communicator System," Jun. 5-9, 2000, Proceedings of Acoustics, Speech, and Signal Processing (ICASSP'00), 4 pages.
Sato, H., "A Data Model, Knowledge Base, and Natural Language Processing for Sharing a Large Statistical Database," 1989, Statistical and Scientific Database Management, Lecture Notes in Computer Science, vol. 339, 20 pages.
Schnelle, D., "Context Aware Voice User Interfaces for Workflow Support," Aug. 27, 2007, Dissertation paper, 254 pages.
Sharoff, S., et al., "Register-domain Separation as a Methodology for Development of Natural Language Interfaces to Databases," 1999, Proceedings of Human-Computer Interaction (INTERACT'99), 7 pages.
Shimazu, H., et al., "CAPIT: Natural Language Interface Design Tool with Keyword Analyzer and Case-Based Parser," NEC Research & Development, vol. 33, No. 4, Oct. 1992, 11 pages.
Shinkle, L., "Team User's Guide," Nov. 1984, SRI International, Artificial Intelligence Center, 78 pages.
Shklar, L., et al., "Info Harness: Use of Automatically Generated Metadata for Search and Retrieval of Heterogeneous Information," 1995 Proceedings of CAiSE'95, Finland.
Singh, N., "Unifying Heterogeneous Information Models," 1998 Communications of the ACM, 13 pages.

(56) References Cited

OTHER PUBLICATIONS

SRI2009, "SRI Speech: Products: Software Development Kits: EduSpeak," 2009, 2 pages, available at http://web.archive.org/web/20090828084033/http://www.speechatsri.com/products/eduspeak.shtml.

Starr, B., et al., "Knowledge-Intensive Query Processing," May 31, 1998, Proceedings of the 5th KRDB Workshop, Seattle, 6 pages.

Stern, R., et al. "Multiple Approaches to Robust Speech Recognition," 1992, Proceedings of Speech and Natural Language Workshop, 6 pages.

Stickel, "A Nonclausal Connection-Graph Resolution Theorem-Proving Program," 1982, Proceedings of AAAI'82, 5 pages.

Sugumaran, V., "A Distributed Intelligent Agent-Based Spatial Decision Support System," Dec. 31, 1998, Proceedings of the Americas Conference on Information systems (AMCIS), 4 pages.

Sycara, K., et al., "Coordination of Multiple Intelligent Software Agents," International Journal of Cooperative Information Systems (IJCIS), vol. 5, Nos. 2 & 3, Jun. & Sep. 1996, 33 pages.

Sycara, K., et al., "Distributed Intelligent Agents," IEEE Expert, vol. 11, No. 6, Dec. 1996, 32 pages.

Sycara, K., et al., "Dynamic Service Matchmaking Among Agents in Open Information Environments ," 1999, SIGMOD Record, 7 pages.

Sycara, K., et al., "The RETSINA MAS Infrastructure," 2003, Autonomous Agents and Multi-Agent Systems, vol. 7, 20 pages.

Tyson, M., et al., "Domain-Independent Task Specification in the TACITUS Natural Language System," May 1990, SRI International, Artificial Intelligence Center, 16 pages.

Wahlster, W., et al., "Smartkom: multimodal communication with a life-like character," 2001 Eurospeech—Scandinavia, 7th European Conference on Speech Communication and Technology, 5 pages.

Waldinger, R., et al., "Deductive Question Answering from Multiple Resources," 2003, New Directions in Question Answering, published by AAAI, Menlo Park, 22 pages.

Walker, D., et al., "Natural Language Access to Medical Text," Mar. 1981, SRI International, Artificial Intelligence Center, 23 pages.

Waltz, D., "An English Language Question Answering System for a Large Relational Database," © 1978 ACM, vol. 21, No. 7, 14 pages.

Ward, W., et al., "A Class Based Language Model for Speech Recognition," © 1996 IEEE, 3 pages.

Ward, W., et al., "Recent Improvements in the CMU Spoken Language Understanding System," 1994, ARPA Human Language Technology Workshop, 4 pages.

Ward, W., "The CMU Air Travel Information Service: Understanding Spontaneous Speech," 3 pages.

Warren, D.H.D., et al., "An Efficient Easily Adaptable System for Interpreting Natural Language Queries," Jul.-Dec. 1982, American Journal of Computational Linguistics, vol. 8, No. 3-4, 11 pages.

Weizenbaum, J., "ELIZA—A Computer Program for the Study of Natural Language Communication Between Man and Machine," Communications of the ACM, vol. 9, No. 1, Jan. 1966, 10 pages.

Winiwarter, W., "Adaptive Natural Language Interfaces to FAQ Knowledge Bases," Jun. 17-19, 1999, Proceedings of 4th International Conference on Applications of Natural Language to Information Systems, Austria, 22 pages.

Wu, X. et al., "KDA: A Knowledge-based Database Assistant," Data Engineering, Feb. 6-10, 1989, Proceeding of the Fifth International Conference on Engineering (IEEE Cat. No. 89CH2695-5), 8 pages.

Yang, J., et al., "Smart Sight: A Tourist Assistant System," 1999 Proceedings of Third International Symposium on Wearable Computers, 6 pages.

Zeng, D., et al., "Cooperative Intelligent Software Agents," The Robotics Institute, Carnegie-Mellon University, Mar. 1995, 13 pages.

Zhao, L., "Intelligent Agents for Flexible Workflow Systems," Oct. 31, 1998 Proceedings of the Americas Conference on Information Systems (AMCIS), 4 pages.

Zue, V., et al., "From Interface to Content: Translingual Access and Delivery of On-Line Information," 1997, Eurospeech, 4 pages.

Zue, V., et al., "Jupiter: A Telephone-Based Conversational Interface for Weather Information," Jan. 2000, IEEE Transactions on Speech and Audio Processing, 13 pages.

Zue, V., et al., "Pegasus: A Spoken Dialogue Interface for On-Line Air Travel Planning," 1994 Elsevier, Speech Communication 15 (1994), 10 pages.

Zue, V., et al., "The Voyager Speech Understanding System: Preliminary Development and Evaluation," 1990, Proceedings of IEEE 1990 International Conference on Acoustics, Speech, and Signal Processing, 4 pages.

Bussler, C., et al., "Web Service Execution Environment (WSMX)," Jun. 3, 2005, W3C Member Submission, http://www.w3.org/Submission/WSMX, 29 pages.

Cheyer, A., "About Adam Cheyer," Sep. 17, 2012, http://www.adam.cheyer.com/about.html, 2 pages.

Cheyer, A., "A Perspective on AI & Agent Technologies for SCM," VerticalNet, 2001 presentation, 22 pages.

Domingue, J., et al., "Web Service Modeling Ontology (WSMO)—An Ontology for Semantic Web Services," Jun. 9-10, 2005, position paper at the W3C Workshop on Frameworks for Semantics in Web Services, Innsbruck, Austria, 6 pages.

Guzzoni, D., et al., "A Unified Platform for Building Intelligent Web Interaction Assistants," Proceedings of the 2006 IEEE/WIC/ACM International Conference on Web Intelligence and Intelligent Agent Technology, Computer Society, 4 pages.

Roddy, D., et al., "Communication and Collaboration in a Landscape of B2B eMarketplaces," VerticalNet Solutions, white paper, Jun. 15, 2000, 23 pages.

* cited by examiner

SPEECH RECOGNITION REPAIR USING CONTEXTUAL INFORMATION

BACKGROUND OF THE INVENTION

The present invention relates to speech recognition systems, and in one embodiment speech recognition systems which are used to control a data processing system.

A common problem with many speech recognition systems is accuracy. A user can speak to a speech recognizer and the system can respond with recognized text, but the recognized text can often contain many errors because the speech recognizer did not properly recognize the human user's words.

Speech recognition can be used to invoke voice dialing on a telephone, such as when a user speaks the command "call mom" on the telephone. The use of speech to control a data processing system can result in abnormal system behavior when a transcription error from the speech recognizer system decides that the user spoke "call Tom" instead of "call mom." Transcription errors may be caused by a hardware deficiency, such as the inability to capture high quality audio recording via a Bluetooth headset or user error such as incorrect or incomplete pronunciation or background noise. Some speech recognition systems can employ the use of context to improve the speech recognition system; U.S. Pat. No. 7,478,037 provides an example of a speech recognition system which employs context to aid in the speech recognition process.

SUMMARY OF THE DESCRIPTION

An embodiment of the invention provides a speech control system that can recognize a spoken command and associated words (such as "call mom at home") and can cause a selected application (such as a phone dialer) to execute the command to cause the system (which can be a smartphone) to perform an operation based on the command and associated words (such as, place a phone call to mom at home). The speech control system can, in one embodiment, use a speech recognizer that includes a conventional acoustic model and a conventional language model to generate a text output from a digitized input obtained from a human user's speech. The speech control system can, in one embodiment, be launched by a speech assistant application that the user can invoke, and this speech assistant application can interpret and repair the text output from the speech recognizer and provide a repaired text output to a selected application in a set of applications; the set of applications can include, for example, one or more applications such as a telephone application (to dial and establish a voice telephone call connection) and a media player application (e.g. iTunes) and an SMS (Short Message Service) "text message" application and video conferencing (e.g. "FaceTime") or chat applications and an application to find or locate individuals such as friends and other applications.

The speech assistant application, in one embodiment, interprets the text output using a set of interpreters, each of which are designed to interpret a specific type of text that the set of applications use. For example, a first name interpreter is designed to interpret first names (in a first name field) in an address book or contacts database, a last name interpreter is designed to interpret last names (in a last name field) in the address book or contacts database, a full name interpreter is designed to interpret full names in the address book or contacts database, and a business name interpreter is designed to interpret business names in the address book or contacts database. These interpreters can, in one embodiment, be configured to use different algorithms or processes to interpret each word in the text output; for example, a full name interpreter can use a fuzzy matching (with edit distance similarity measurements) algorithm to compare a word in the text output to words in the address book or contacts database but does not, in one embodiment, use an n-gram algorithm to compare a word in the text output to words in the address book or contacts database, while a first name interpreter uses the n-gram algorithm to compare a word in the text output to words in the address book or contacts database. Moreover, these interpreters can, in one embodiment, use different searching algorithms when searching, for matches, through the address book or contacts database. Each interpreter can, in one embodiment, also use the context (e.g. the context can include an indication that a media player is playing a song) when interpreting a word. The context can include, in one embodiment, a history of user inputs such as a conversation history (e.g. prior recognized speech) or a status of applications in the set of applications, etc. Each interpreter in the set can, in one embodiment, process each word in the text output to attempt to determine if it can repair the word, and each interpreter, in one embodiment, decides, on its own, whether it can repair each word; the interpreter produces a score or confidence level that indicates whether it can repair the word.

A controller of the set of interpreters can, in one embodiment, process the results of the set of interpreters by ranking the resulting repaired interpretations, using each interpreter's score or confidence level to perform the ranking and then merging the ranked interpretations. The merging seeks, in one embodiment, to avoid an overlap in interpretations so that only an output from one interpreter is used to repair a particular word.

In one embodiment, the speech assistant application can determine a command in the text output from the speech recognizer system based on a position of a word in a string of words or by using a grammar parser to determine the command, and that command, along with a repaired speech transcription, can be passed, by the speech assistant application, to a particular application in a set of applications for the particular application to execute the command using the repaired speech transcription. In this embodiment, the speech assistant application can select the particular application based on the command; for example, a "call" command in the recognized text causes the speech assistant application to pass, through an API, the "call" command along with the repaired speech transcription to a telephone dialer or telephone application while a "stop" command in the recognized text causes the speech assistant application to pass, through the API, the "stop" command to a media player (such as iTunes) to stop playing the currently playing song. In this example, the context provided to a media player interpreter in the set of interpreters can include the status of media (e.g., the context includes the status that the Beatles song "Come Together" is currently playing at the time that the speech input containing the recognized word "stop" was received by the speech recognizer system). In this example, a user does not need to select a particular desired application before speaking a command; rather, the user speaks with the speech assistant application being the front most application (and having the speech input focus) and the speech assistant application then automatically (without the user specifying directly the application) selects the proper application, in the set of applications, based on the command, and then passes the command, through an API, to the selected application.

The embodiments described herein can be implemented as machine readable non-transitory storage media or as methods or as data processing systems.

The above summary does not include an exhaustive list of all aspects of the present invention. It is contemplated that the invention includes all systems and methods that can be practiced from all suitable combinations of the various aspects summarized above, and also those disclosed in the Detailed Description below.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
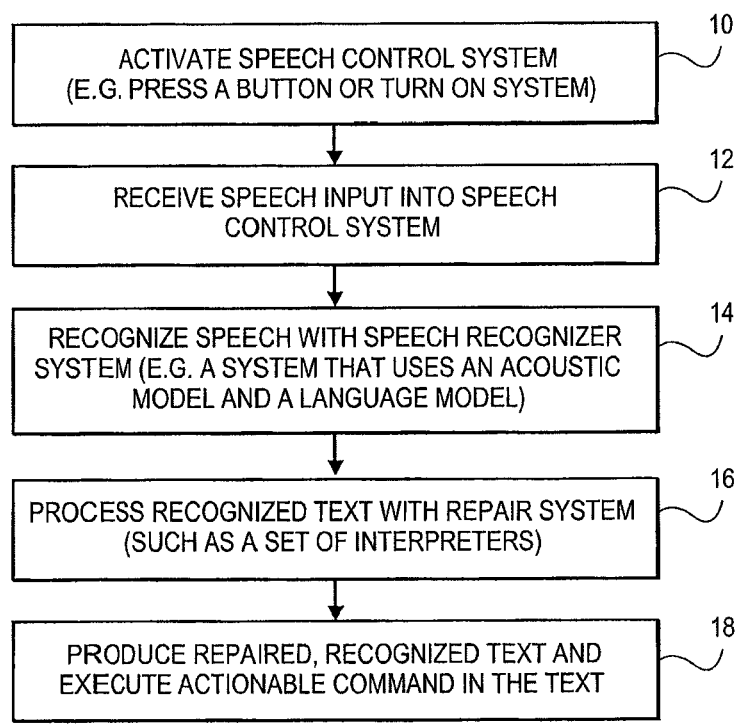
FIG. 1 shows a flowchart which illustrates a method according to one embodiment of the present invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

One embodiment of the present invention provides a set of interpreters, each of which are designed or configured to repair errors of a particular type in recognized text provided by the speech recognizer system. The speech recognizer system can be a conventional software based speech recognition system which includes both an acoustic model and a language model, and the combination of these models in the speech recognizer system produces a text output which is then repaired by the set of interpreters. The interpreters can be configured to operate with particular databases and content in the databases as well as particular applications which can use those databases. In one embodiment, the separation of the set of interpreters from the speech recognizing system (such that the set of interpreters operate after the speech recognition system provides an output), allows greater flexibility in designing a speech control system. Any changes in the particular applications and/or those databases can be reflected in changes in the appropriate and corresponding interpreters without having to change the underlying speech recognition system. For example, a data processing system can use an off-the-shelf, conventional speech recognition system and then provide tailored interpreters which are tailored for particular applications and particular databases containing content which will appear in spoken commands for each application or a set of applications on a data processing system. For example, a command such as "call John Smith on mobile" uses words which presumably should appear in a user's contact or address book database. The first name John should appear in the database and the last name Smith should appear in the database; moreover, the database should include a field identifier indicating that one of the phone numbers is the mobile phone number for John Smith. The command "call" can be required to be at the beginning of the spoken command or a data processing system can use a grammar parser to determine the position of the command from the spoken command. If the contacts database changes or the phone application changes (e.g. a command is added or deleted or revised), the interpreter for that database and application can be changed without having to revise the speech recognition system (e.g., without having to revise the speech recognition system's language model). The interpreter can be changed by, for example, changing the fields (in a database) that it interacts with or changing the algorithms used to match words in text output (from the speech recognition system) with the fields in the database or by changing the searching algorithms used to search through the database.

FIG. 1 shows an example of a method according to one embodiment of the present invention which can use a set of interpreters to repair a text output which has been provided by a speech recognizer system, such as the system that uses an acoustic model and a language model. The method can begin in operation 10 in which a speech control system is activated. For example, in one embodiment, a user can press a button or press and hold a button or select or launch a speech assistant application or merely turn on a data processing system which invokes a speech assistant application as a background demon which runs at all times. After the speech control system has been activated (for example, the speech assistant application is front most and has the speech input focus), the speech control system receives speech input (12). In one embodiment, the user can speak a command such as "call John Smith on mobile" or "tell John Smith that I am in traffic and will be late for the meeting" or "play all songs by the Beatles" or "tell my son to pick up milk if he goes to Safeway after school", etc. Then in operation 14, a conventional speech recognition system or speech recognizer can recognize words received in the spoken input which has been digitized and processed using the conventional speech recognition system which can employ both an acoustic model and a language model to produce a text output which can be in a Unicode or ASCII format or encoding or other character encodings. Conventional speech control or speech recognition systems use the resulting output at this point without further processing. In at least some embodiments of the present invention, the output is processed further in order to determine whether or not to repair one or more words in the recognized text output from the speech recognizer system provided by operation 14. For example, in one embodiment of the present invention, operation 16 is performed by processing the recognized text, which can be in Unicode encoding, to determine whether or not one or more words in the recognized text can be repaired. In one embodiment, the repair is performed by a set of interpreters, where each interpreter is designed or configured to repair a particular type of error such as an error in a particular field of a database's data structure. For example, one interpreter can be configured and designed to repair errors in the first name of a contact database while another interpreter can be designed to repair errors in a business name in a contact database. The manner in which each of the interpreters is configured to repair specific types of error in specific fields, is described further below through the use of different algorithms, including different processing algorithms or searching algorithms. As a result of the processing in operation 16, the repaired text is provided in operation 18 and then can be provided as an actual command to a particular application which can be one application within a set of applications.

In one embodiment, a data processing system may include two applications in the set, such as a telephone dialer which is controlled by speech input and a media player, such as iTunes which is controlled by speech input. In another embodiment, the set of applications can include those applications as well as a text messaging (SMS-short messaging service) application, and an email application, and a calendar application, and a reminder application, and a local search application and a video conferencing application and a person or object locating application. A local search application is one in which a user instructs a data processing system to provide information about a local business or local entity which is geographically close to the user's current position. For example a local search spoken command can be "find a Chinese restaurant" which can invoke a search through a web browser for local Chinese restaurants based upon the user's current location. Alternatively the spoken command could be, in the case of a local search application, "call DNJ Auto Repair". If a contact database in the user's system does not include an entry for DNJ Auto Repair, then the system can in response invoke a web search for the business known as DNJ Auto Repair in an area which is local to the user's current location (such as a location determined by a GPS receiver).

Figure 2:
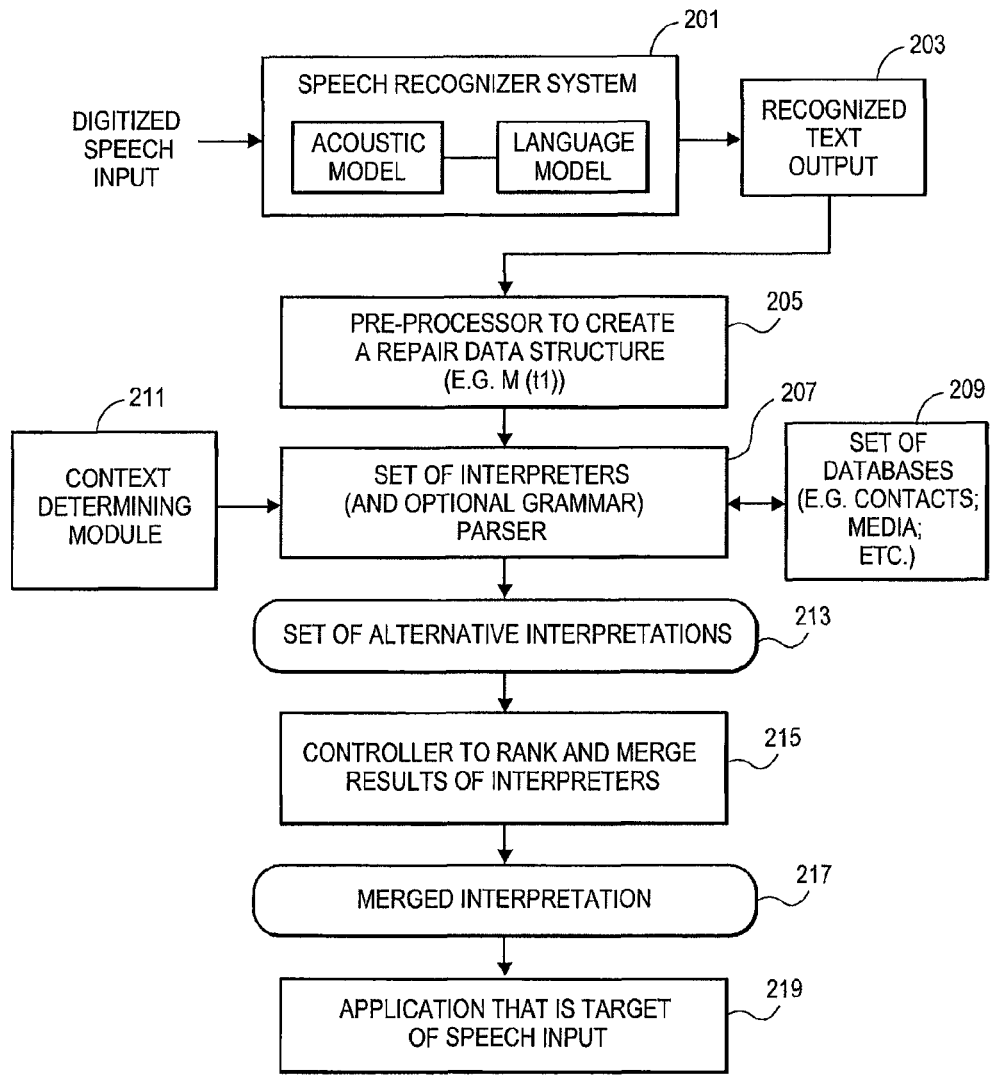
FIG. 2 shows an example of an architecture which can include software modules and data structures according to one embodiment of the present invention.

FIG. 2 shows an example of an architecture of a data processing system which can include a plurality of software modules or hardware subsystems to implement each of the blocks shown in FIG. 2 which also include data structures, such as databases and outputs from the modules. In one embodiment, each of the elements 201, 205, 207, 211, 215, and 219 can be implemented as software modules or software applications which interact through one or more APIs in order to perform the method shown in FIG. 3 or the method shown in FIG. 5A or a combination of the methods shown in FIGS. 3 and 5A. The architecture shown in FIG. 2 can also include a speech assistant application which provides the digitized speech input to a speech recognizer system 201; in one embodiment, the speech assistant application can include the set of interpreters shown as element 207 and the controller shown as element 215, and the speech assistant application can operate as the preprocessor shown as element 205. Further, the speech assistant application can also include the context determining module which is shown as element 211.

Element 201 in FIG. 2 can include a conventional speech recognizer system which employs both an acoustic model and a language model to recognize words in digitized spoken commands or inputs from a human user. In one embodiment, a microphone collects the spoken sounds from the human user and those sounds are digitized and provided to the speech recognizer system shown as element 201 which in turn produces a recognized text output, in a character encoding format such as Unicode, shown as element 203. This text output 203 is then provided to element 205 which can be a preprocessor which creates a repair data structure which can be in one embodiment a parsed data structure using tokens, described further below in conjunction with FIG. 7 which provides an example of such a parsed data structure which is used in the repair process of, for example, the method shown in FIG. 3 or the method shown in FIG. 5A. Tokens, in one embodiment, can be used in the data structure to represent each word in the text output 203, and the set of interpreters in element 207 can operate on those tokens or words in order to determine whether or not to repair each of the words in the text output 203. In one embodiment, an optional grammar parser can be included in element 207 in order to determine which word in the phrase is the command which can be used to select a particular application out of the set of applications as will be described further below in conjunction with FIG. 5A. An example of a set of interpreters which can be used in element 207 is shown in FIG. 4, which includes a set of interpreters which can use different algorithms either for searching their corresponding databases or for processing words to determine whether a match exists between the words in the text output and the words in the corresponding databases.

Figure 4:
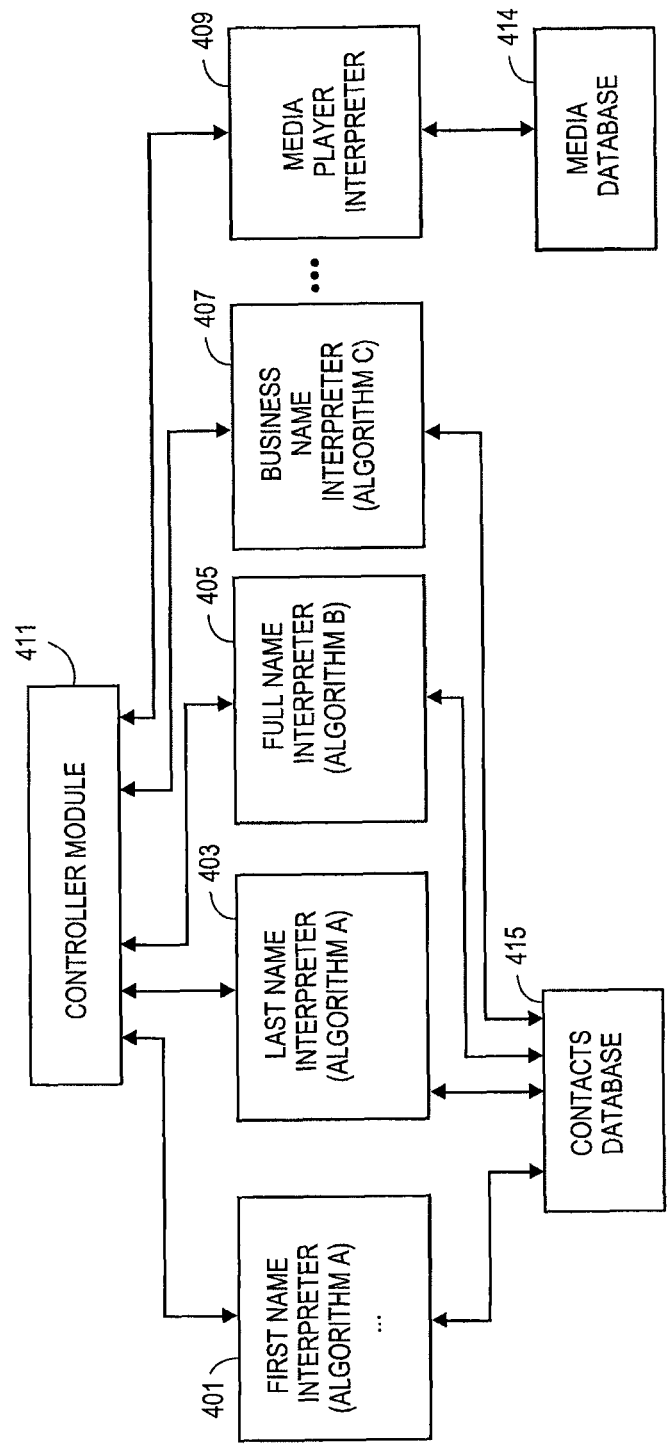
FIG. 4 shows an example of an architecture according to one embodiment of the present invention in which a controller module is used to rank and merge repaired results from a set of interpreters according to one embodiment of the present invention.
Figure 8:
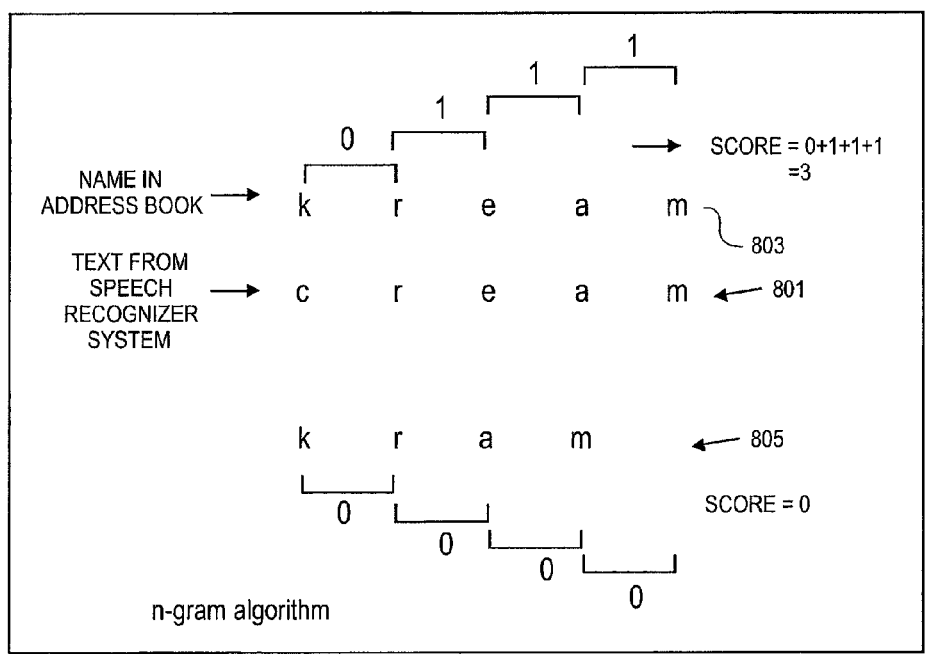
FIG. 8 shows an example of a particular algorithm which can be used by one or more of the interpreters described herein when the interpreter is determining whether or not to repair a particular word that has been recognized by a speech recognition system.

FIG. 8 shows an example of an algorithm which can be used by one or more interpreters in the set of interpreters in order to determine whether a match exists between a word in the text output 203 and a word in one or more databases, such as the contacts database 415 shown in FIG. 4. These various algorithms will be described further below in conjunction with FIGS. 4 and 8. Element 211 can be a context determining module, such as the context determining model 601 shown in FIG. 6. The output from this context determining module in element 211 is provided to one or more of the interpreters in the set of interpreters shown in element 207 in order for those interpreters to use the context when determining whether or not a word in the text output 203 can be repaired by each of the interpreters.

Each of the interpreters can be configured or designed to interact with one or more databases, such as the databases in element 209. These databases can include a contacts or address book database, an email database, a text messaging database, a media database, such as an iTunes database or a database of songs or movies or a combination of songs and movies, etc. Other databases and corresponding interpreters to interact in those databases can also be included in one embodiment of the present invention. In a typical operation, an interpreter designed to interact with a particular database (and not interact with other databases) will process each word other than a command word to determine whether and how much the word matches an existing word in its corresponding database. For example, the first name interpreter can, using an n gram algorithm as shown in FIG. 8, search for matches of a word which might be a first name in a contact database by searching through the database for that word and then determining whether or not a repair should be performed by the use of one or more algorithms designed to determine a level of matching between words in the database and the word currently be processed by the interpreter. In one embodiment, each interpreter processes every word other than the command word in text output 203 to determine whether that interpreter can repair the word. Moreover, each interpreter can provide a score or confidence level which indicates the level of matching or whether the word should be repaired with an alternative word found in the database.

The set of interpreters shown in element 207 can, in one embodiment, provide a set of alternative interpretations, and these alternative interpretations are processed by, in one embodiment, a controller, shown in element 215 which can rank and merge the results of the interpreters in order to provide a merged interpretation 217 which can then be provided to an application which is the target of the command in the speech input.

In one embodiment, the controller in element 215 can be the controller module 411 shown in FIG. 4 which interacts with a set of interpreters shown in FIG. 4, which in turn interact with one or more databases by performing searches through those databases and processing matches in those databases using one or more algorithms as is described further below. The speech assistant application such as speech assistant application 511 shown in FIG. 5B can call, to an API, the target application shown as element 219 and can provide as a parameter of those calls the command and the repaired transcription which is the merged interpretation 217 in one embodiment.

Figure 3:
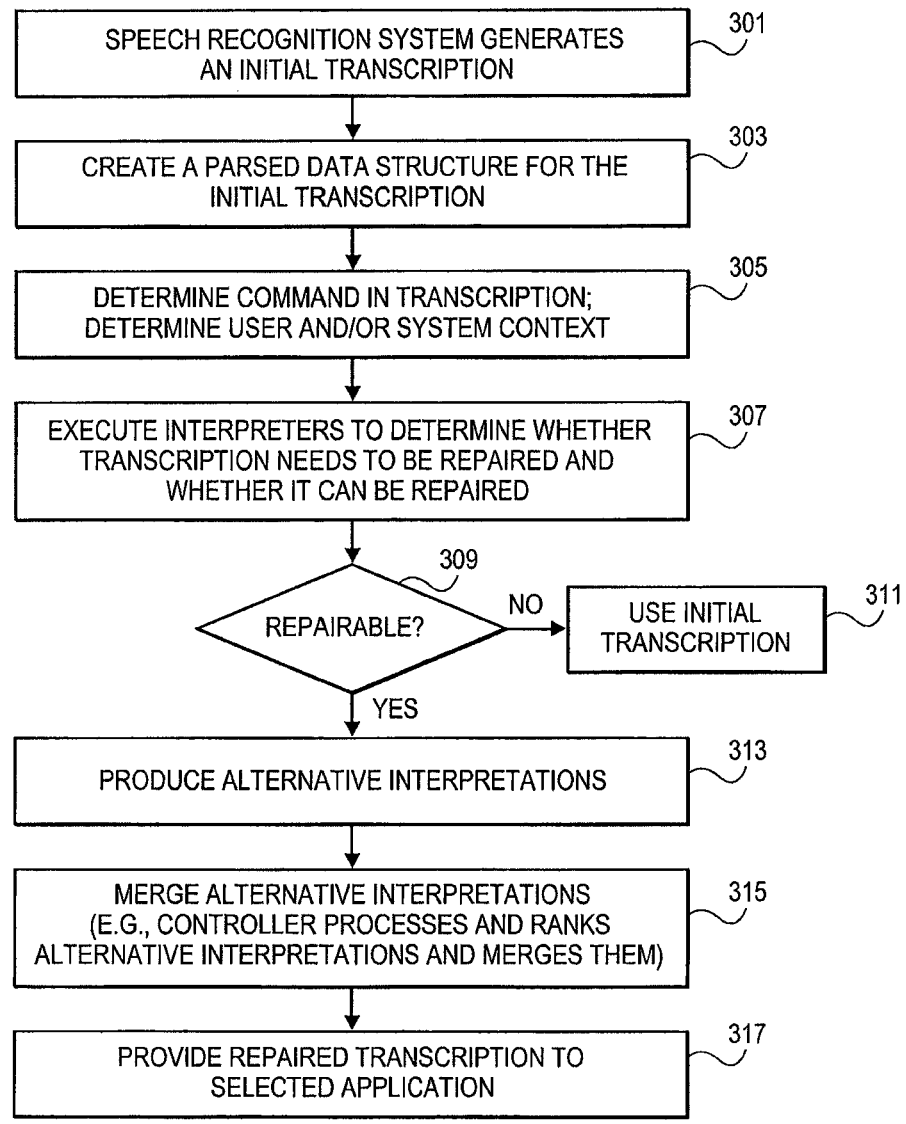
FIG. 3 is a flowchart which shows a method according to one embodiment of the present invention.
Figure 7:
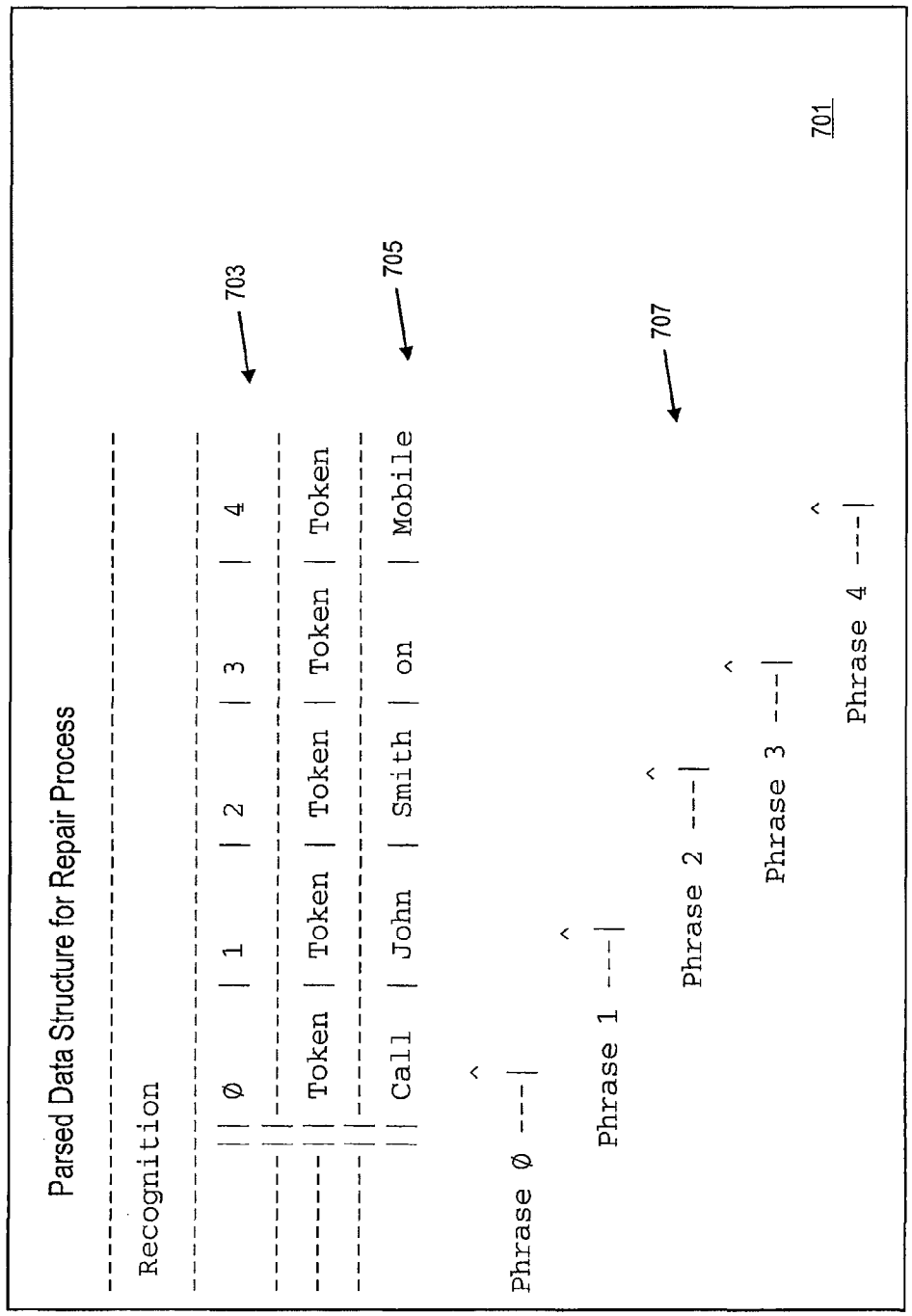
FIG. 7 shows an example of a data structure which can be used in the repair process in one or more embodiments described herein.

A method for repairing words in recognized text output, such as recognized text output 203, is shown in FIG. 3. The method of FIG. 3 can be performed with the architecture shown in FIG. 2 and with the architecture shown in FIG. 4 and use the one or more APIs shown in FIG. 5B. Moreover, the method of FIG. 3 can use a speech assistant application which can select an application out of a set of applications based upon the command which is detected in the recognized text output 203. The method of FIG. 3 can begin in operation 301 in which the speech recognition system generates an initial transcription. This can be the recognized text output 203 shown in FIG. 2. The speech recognition system used in operation 301 can be the speech recognizer system 201 which includes a conventional acoustic model and language model used to recognize words in the digitized speech input. In operation 303, the data processing system which is performing the method of FIG. 3 can create a parsed data structure for the initial transcription. This parsed data structure can be used in the repair process of FIG. 3, and an example of such a data structure is shown in FIG. 7 which will be described further below. In operation 305, the system determines the command in the transcription and also determines the user and/or system context. The command can be determined by requiring the user to speak the command first or by using a grammar parser which parses the text output, such as the text output 203, to determine the location of the command and therefore the command word itself in the text output, such as the text output 203.

In addition, in the embodiment shown in FIG. 3, operation 305 also includes determining the user and/or system context. The context information can include a list of which applications are launched and running and which applications are not launched and running, whether or not a media player is playing media, such as a song or movie, and can also include user state based on sensors, such as proximity sensors, orientation sensors, accelerometers, and other sensors. Further, the context information can also include prior conversation history which can include (for each application in the set of applications) previously recognized text, such as play the Beatles album "Abbey Road", etc. In one embodiment, the context can include application domains that are mentioned in a previous conversation, and can also include whether or not the current application state expects a confirmation from a user such as a yes or a no or a cancel, etc. Choice values (for a confirmation) can be specified by the system based upon the current conversation context. For example, the user asks the system to send an email to a friend. After composing the message, the system requests the user to confirm. At this point, the confirmation choice values are populated with "yes", "cancel", and "change it". The context information can also include, in one embodiment, the current location of the user, such as the current GPS location which can be used if the user requests a local search as described herein. The context information can also include a locale context and/or a language context; for example, an input language context can be used by the set of interpreters to assist in speech repair. In one embodiment, when the language context (which is determined from a user's preference setting in one embodiment) is English, then an interpreter can repair "yet" in a text output (initial transcription from a speech recognition system) to be "yes".

In operation 307, the system executes each interpreter in the set of interpreters, in one embodiment, in order to determine whether the transcription (e.g. recognize text output 203) needs to be repaired and whether it can be repaired. In one embodiment, all interpreters in the set of interpreters are executed in operation 307. In another embodiment, only those interpreters for applications that are currently executing are executed to determine whether the transcription needs to be repaired for only those currently executing applications. In one embodiment, each interpreter decides on its own, based on its algorithms, whether it can repair one or more words in the recognized text output provided by the speech recognizer system, such as speech recognizer system in element 201 of FIG. 2. This operation is shown as FIG. 309. If none of the interpreters can repair or decide that no repair is needed then, in operation 311 the initial transcription provided by the speech recognizer system, such as recognized text output 203 is used and provided to the selected application. If, on the other hand, one or more words has been determined to be repairable, then a set of alternative interpretations is provided which includes the initial transcription (e.g. recognized text output 203) as well as repaired interpretations. For example, if it is determined that the user has no "John" in their contacts database but does have a "Jon" in their contacts database, then the word "Jon" will be an alternative interpretation of the word "John". Each interpreter maintains scores or confidence levels indicating the level of matching for one or more alternative interpretations that it can provide to, for example, a controller such as controller module 411 shown in FIG. 4. The scores or confidence levels can be used when ranking the various interpretations in order to select the highest matching interpretation. The scores or confidence levels can be determined on a per word basis or on a per phrase (e.g. two or three word) basis. Then in operation 315, a controller module or other module can perform a merging operation which, in one embodiment, attempts to merge non-overlapping interpretations based upon the confidence score or matching or ranking score provided by each interpreter. The merged interpretation which is the final transcription that has been repaired can then be provided in operation 317 to a selected application. In one embodiment, the selected application is selected based upon the command which was recognized or determined in operation 305.

FIG. 4 shows an example of an architecture which uses a set of interpreters and a controller module to repair words in an initial transcription, such as recognized text output 203. In one embodiment, each interpreter is configured or designed, through their appropriate use of algorithms, to process words in certain fields of one or more databases. For example, in the embodiment shown in FIG. 4, interpreter 401 is configured to repair words in the first name field of a contacts database 415 using algorithm A which may be, in one embodiment, an n-gram algorithm such as the algorithm shown in FIG. 8. In one embodiment, an interpreter may employ several algorithms or just one algorithm. The algorithms can include, in addition to an n-gram algorithm, a fuzzy matching algorithm which can use an edit distance which measures a similarity between two texts or can use a phonetic matching algorithm, such as a double metaphone algorithm or a soundex algorithm. In addition, a prefix, suffix partial token algorithm may be used and other algorithms known in the art for determining matches or degree of similarity between two texts can also be used. In one embodiment, different interpreters use different algorithms such that one interpreter may be use algorithm A while another interpreter uses algorithm B but not algorithm A. The algorithms are, in one embodiment, tailored to finding matches in corresponding databases and searching the databases, and in particular are tailored to the particular field each interpreter is designed to correct. Interpreter 403 can be a last name interpreter which uses algorithm A, and interpreter 405 can be a full name interpreter which uses algorithm B. Further, the set of interpreters shown in FIG. 4 can include a business name interpreter 407 which uses algorithm C which is different than algorithms B and algorithm A. Each of the interpreters 401, 403, 405, and 407 have access to contacts database 415 but not database 414 in order to search for matches in each of their corresponding fields. In addition to the use of different algorithms for the different fields, each interpreter can employ different searching algorithms when searching through their corresponding database. The set of interpreters shown in FIG. 4 also includes a media player interpreter 409 which is designed to search through one or more fields in a media database 414, such as an iTunes database of songs and/or movies, and other media, etc.

Each interpreter in the architecture shown in FIG. 4 can provide one or more alternative interpretations, such as the set of alternative interpretations 213 to the controller module 411. For example, the first name interpreter 401 may provide two different alternative interpretations of what appears to be a first name in a spoken command, and those two different interpretations will each include a scoring or ranking indicating the degree of confidence or probability that the interpretation is correct. The score or ranking is based upon the level of matching or similarity, in one embodiment. FIG. 8 shows an example of two interpretations with different scores.

FIG. 8 shows an example of how the n-gram algorithm can be used to provide scores for ranking of a matching. In this example, the text from the speech recognizer system, such as recognized text output 203, includes the word "cream" 801. This word from the speech recognizer system is then compared to at least two different words 803 and 805 found in the user's address book, and in particular word 801 is compared to words 803 and 805 as shown in FIG. 8. The algorithm provides a score by comparing pairs of letters against the text 801. As can be seen from FIG. 8, the name Kream is a closer match (as it has a score of three) than the other name found in the address book, name 805 which has a score of zero.

Figure 6:
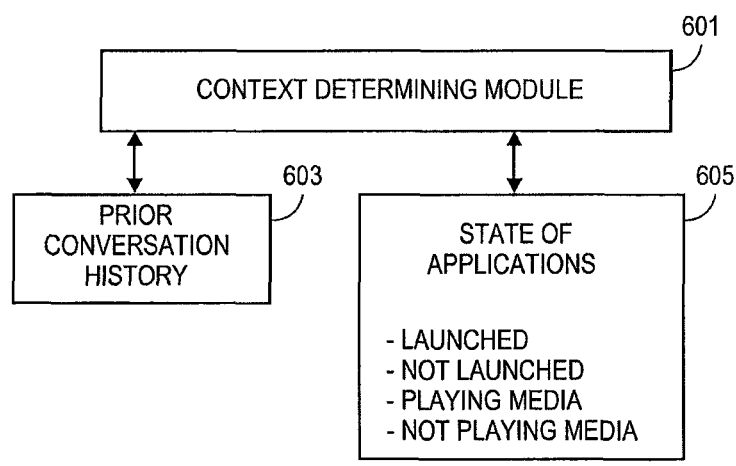
FIG. 6 shows an architecture according to one embodiment in which the current context is determined and used in a speech recognition system.

Each interpreter in the set of interpreters can use context information provided by a context determining module such as the context determining module shown in element 211 or the context determining module 601 in FIG. 6. The context can include a prior conversation history which indicates whether commands are spoken for one or more applications in the set of applications and optionally the commands themselves in addition to the words themselves. Prior conversation history 603 provides this information which can also include prior user inputs such as user inputs on a touch screen or keyboard, etc. Context determining module can determine the context from the prior conversation history and also from the state of application 605 which can include indicators indicating which applications are launched and executing, which applications are not launched, and therefore not executing, and whether media is playing, etc. For example, media player interpreter 409 can use a context indicator when media is playing to repair an initial transcription of the word "stock" to be "stop" because the user has previously caused media to start playing and in that context while the media is playing the word "stock" is interpreted to be "stop" by the media player interpreter 409. The context determining module can determine a language or locale context as described herein. The context determining module 601 can also include inputs from sensors, such as orientation sensors, or proximity sensors or light sensor, etc. as part of the context determining process. Further, the context determine module 601 can include a history of prior user inputs. The context determining module 601 collects this various information regarding context and provides it to the interpreters which use the context to help in making decisions of whether a word can be repaired in a spoken command input.

A specific implementation according to an embodiment of the present invention will now be provided in conjunction with FIG. 7. Data structure 701 represents the words in the recognized text output with tokens 703.

The process of speech recognition takes a speech audio recording and transcribes that into one or more text interpretations. The initial transcription is shown as text string 705. These transcribed texts are stored in a table-like data structure called Recognition in one embodiment and shown in FIG. 7.

A basic construct of the Recognition is a Token. A Token is an immutable string that represents an atomic unit of a transcription. If a transcription consists of a sequence of Tokens 703, then each Token is encapsulated in a second-level data structure called Phrase 707. A Phrase is a column-major data structure. An ordered list of Phrase objects forms a Recognition. The existence of a Phrase data structure is to allow for alternative transcriptions.

For example, when a user says "Call John Smith on mobile", a speech assistant application may produce the Recognition shown in FIG. 7:

The process of speech repair takes a Recognition object (shown in FIG. 7) as input and produces a modified Recognition object if any part of the original recognition requires and can be repaired.

An internal data structure called Meta-Repair can be created to assist the speech repair process. This data structure can consist of the following: the original Recognition object (shown in FIG. 7), a Repair object and Token positions relative to the original transcription.

Here is an example of Token positions look-up table for the data structure shown in FIG. 7:

Pair<Start, End>: start and end position of a specific token string relative to the original recognition text
"Call John Smith on Mobile"
Meta-Repair's Token Position List:
[0]: Pair<0,3>
[1]: Pair<5,8>
[2]: Pair<10,14>
[3]: Pair<16,17>
[4]: Pair<19,24>

The Repair object of Meta-Repair consists of a list of alternative interpretations produced by the speech repair procedures. The data structure used to represent an alternative interpretation is called Repair Interpretation.

A Repair Interpretation consists of a text that is a plausible replacement for a substring in the original recognition and the start and end position that substring. For example, if "Jon" should be replacement for "John", then a Repair Interpretation for the data structure shown in FIG. 7 can be described as the following:
Repair Interpretation:
　text: "Jon"
　start: 5
　end: 8

The Meta-Repair object contains information to perform interpretation merge. The merge logic happens after the original transcription is passed, in one embodiment, through all interpreters and if there is one or more repair interpretation produced. The following pseudocode provides an example of a merge function that can be used to merge non-overlapping interpretations from the set of interpreters. The "INPUT: original:Recognition" is shown in FIG. 7.

```
FUNCTION merge
   INPUT:  original::Recognition
           repair::Repair
   OUTPUT: original::Recognition
BEGIN
   IF repair.getRepairInterpretation( ) is EMPTY
      RETURN original;
   ELSE
      String originalText = repair.getOriginalText( );
      List interpretations = repair.getRepairInterpretations( );
      List ranked = rank(originalText, interpretations);
      List nonOverlap = findNonOverlapInterpretations(ranked);
      FOR each RepairInterpretation i in nonOverlap
         List<Phrase> phrases = findRepairPhrases(original, i)
         List<Token> tokens = makeRepairTokens(i);
         addTokensToPhraseHead(phrase, tokens);
      END FOR
      RETURN original;
END
FUNCTION rank
   INPUT:   originalText::String
            interpretations::List<RepairInterpretation>
   OUTPUT:  ranked::List<RepairInterpretation>
   RETURN a sorted interpretation list using a custom Java Comparator
      that imposes a total ordering on a collection of objects.
/**
   Collections.sort(sorted, new Comparator<Repair.Interpretation>( ) {
      @Override
      public int compare(Repair.Interpretation o1,
Repair.Interpretation o2) {
         if (scoreInterpretation(o1) > scoreInterpretation(o2)) {
            return -1;
         } else if (scoreInterpretation(o1) <
scoreInterpretation(o2)) {
            return 1;
         } else {
            return 0;
         }
      }
      private float scoreInterpretation(Repair.Interpretation itp) {
         float score = 0;
         if (itp.isPerfectMatch(getOriginalText( ))) {
            score = getOriginalText( ).length( );
         }
         score += (float) itp.getLength( ) / getOriginalText( ).length( );
         return score;
      }
   })
**/
END
```

Figure 5A:
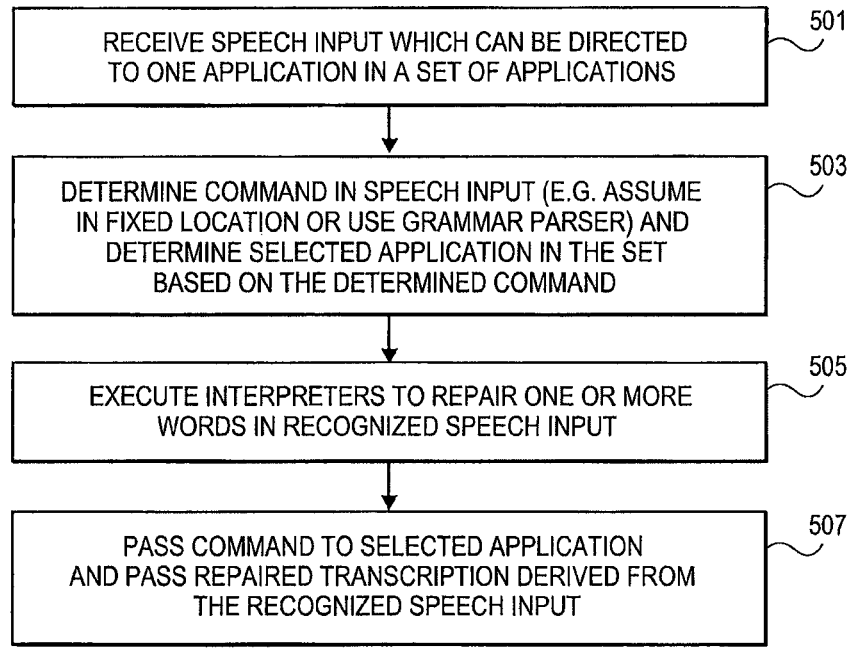
FIG. 5A shows a flowchart which depicts a method according to one embodiment of the present invention.

FIG. 5A illustrates one embodiment of the present invention which can use a speech assistant application that allows the system to select the appropriate application which is determined to be the target of the spoken command based upon the command which is detected in the spoken command. In one embodiment, the speech assistant application can use a grammar parser to detect the command in the spoken command and to thereby select the appropriate application or the user can be required to speak the command as the first word in every spoken command so that the system can determine which word is the command relative to the other words in the spoken input. In this embodiment, the system can select a particular application based upon the spoken command and thereby not require the user to select the application prior to speaking the command in order to make that application the front most application which has the speech input focus of the system. In other words, in this embodiment, the speech assistant application can select one application out of a set of applications based upon the command which is appropriate for the application. In operation 501, the system can receive a speech input which can be directed to one application in a set of applications. The applications can be executing or not executing. In one embodiment, the method can be configured so that only executing applications will be in the set of applications, but in another embodiment, all applications whether executing or not can be in the set of applications to the extent that each application can receive speech input. In operation 503, the speech assistant application can then determine the command in the speech input and can then select the proper application based upon the determined command. For example, if the command is "call", then the proper application in one embodiment is the telephone dialer to establish a telephone phone call with a person specified in the speech input (e.g. call mom at home). The command can be determined by using a grammar parser to locate the command which can be required to be a verb by instructing the user to use verbs or the system can require the user to place the command in a fixed position in the sequence of spoken words. In one embodiment, if the command is the word "tell", then the selected application is the text messaging (SMS) application; if the command is the word "play" or the word "stop", then the selected application is the media player application, etc.

Then in operation 505, the interpreters are executed to repair one or more words in the recognized speech input. If the application is selected in operation 503 prior to executing the interpreters, then only those interpreters which are designed to work with that particular application can be executed rather than executing all of the interpreters which are available in the system for all of the applications which are capable of receiving spoken commands through a speech input. Operation 505 is similar to operation 307 and can use the architecture shown in FIG. 4 in conjunction with the context determining module shown in FIG. 6. In one embodiment, the command which is determined or detected in operation 503 is not repaired. In this case, the interpreters construe the command in the text input as a stop word when performing searches through the one or more databases that the interpreters interact with. Then in operation 507, the speech assistant application can pass the command to the selected application which was determined in operation 503 and can pass the repaired transcription (which resulted from the execution of the interpreters and the merging of the alternative interpretations) to the selected application. In one embodiment, the speech assistant application can perform the passing of the commands along with the repaired transcription through an API, such as one or more APIs as shown in FIG. 5B.

Figure 5B:
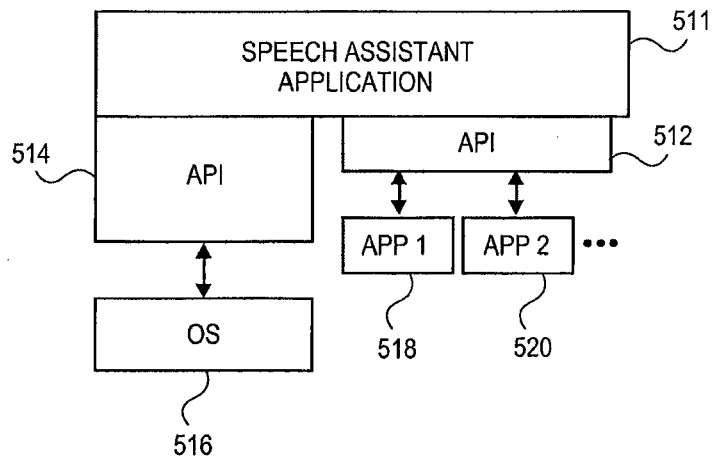
FIG. 5B shows a software architecture which includes one or more APIs which may be employed in one or more embodiments described herein.

The speech assistant application 511 shown in FIG. 5B can be the same as the speech assistant application which performs one or more methods of FIG. 5A. The speech assistant application 511 can determine a context by making a context call through API 514 to the operating system 516 which in turn returns context information, such as the context information described above and/or shown in FIG. 6. The context information can also include a list of which applications are executing and which applications previously received user inputs or previously received spoken commands. The speech assistant application 511 can also make calls to the speech recognizer system which can be a software application executing on the system shown in FIG. 5B which represents the software stack that includes the operating system 516 as well as the speech assistant application 511 and one or more applications in a set of applications, such as applications 518 and 520. The applications 518 and 520 can receive commands which are passed from the speech assistant application through the API 512.

The following are three usage examples of speech repair by a speech assistant application in one embodiment.

(1) "Snap-to-grid" voice dialing. The speech assistant application allows a user to call contacts in the address book database using speech. The user has a contact named "Marc Dickinson" in the address book, and has no contact named "Mark" or "Dick". When the user says "Call Marc Dickinson", the speech recognition incorrectly transcribes the input as "Call Mark Dick son". Instead of telling the user that the assistant cannot complete the operation because it cannot find "Mark Dick son" in the database, speech repair can exploit contact name spelling and use a fuzzy-matching algorithm to generate a more plausible alternative transcription: "Call Marc Dickinson". (2) Disambiguate user intent. The assistant speech application allows a user to send SMS messages and make voice-dialing requests. When the user says, "Tell my wife to pick up milk and fruits if she goes to Safeway after work," the assistant automatically composes a text message to the user's wife. Due to recognition errors, the speech system may incorrectly transcribe the action word "tell" as "call" or "tall". Because a request "Call my wife to pick up milk and fruits if she goes to Safeway after work" or "Tall my wife to pick up milk and fruits if she goes to Safeway after work" does not map to any actionable tasks in the assistant in one embodiment, the default response is usually "Sorry! I don't know what you meant". Speech repair can help to resolve this problem by disambiguating the speech intent using context. For example, knowing that the edit distance between the word "tell" and "tall" is short and a voice dialing command typically don't have a long running string after the target person tokens, an interpreter can rewrite the original transcription as "Tell my wife to pick up milk and fruits if she plan to visit Safeway after work". (3) Disambiguate command/system keywords. The speech system can incorrectly transcribe a short keyword pronunciation. For example, a user says "Stop" and the initial transcription is "Stock"; the user says "Yes", and the initial transcription is "Yet". Speech repair can help to overcome these problems by providing alternative transcriptions when the original transcription text is a less plausible interpretation based on one or more contextual hints. For example, when the assistant is prompting the user for a YES/NO confirmation, it is unlikely that the user would say "Yet" as a follow-up response. Instead of returning "Yet" as the final transcription, the speech repair can overwrite it with "Yes" as a more plausible speech input. Similar repair logic is applicable to the media player domain. If a user has just requested a song to be played and an immediate speech transcription is "Stock", the speech repair can rewrite it with "Stop" as a more plausible command transcription.

Figure 9:
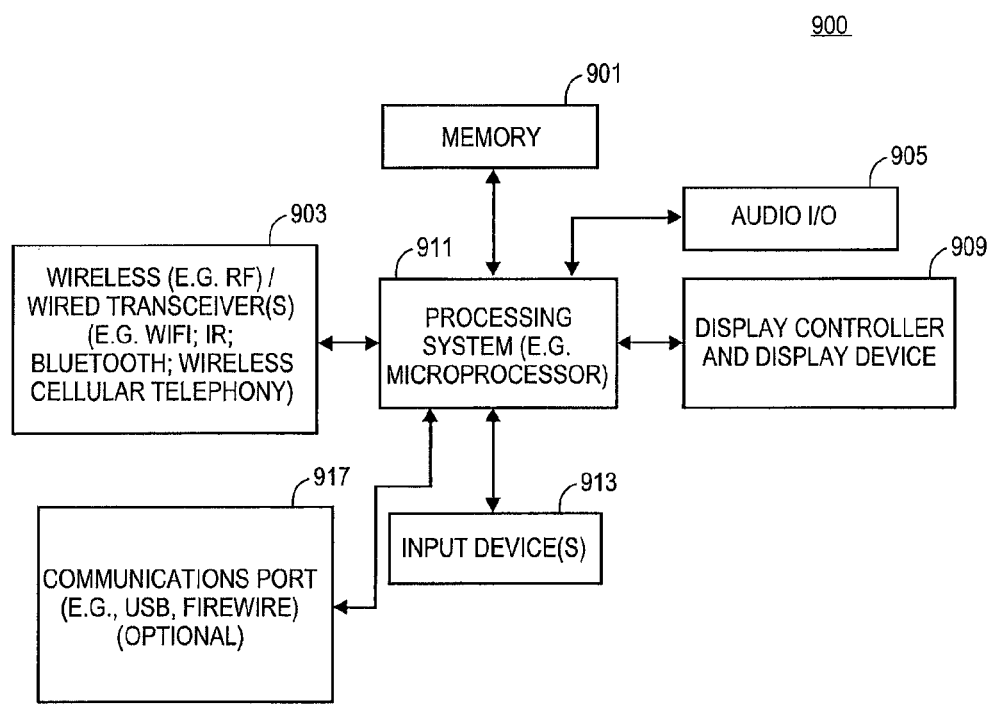
FIG. 9 shows an example of a data processing system according to one embodiment of the present invention.

FIG. 9 shows an example of data processing system 900 which may be used with one embodiment of the present invention. For example and in one embodiment, system 900 may be implemented as a portable data processing device such as a smartphone or tablet (e.g., iPad) device or a laptop or an entertainment system. The data processing system 900 shown in FIG. 9 includes a processing system 911, which may be one or more microprocessors or which may be a system on a chip (integrated circuit) and the system also includes memory 901 for storing data and programs for execution by the processing system. The memory 901 can store, for example, the software components described in conjunction with FIG. 2 and memory 901 can be any known form of a machine readable non-transitory storage medium, such as semiconductor memory (e.g., flash; DRAM; SRAM; etc.) The system 900 also includes an audio input/output subsystem 905 which may include a microphone and a speaker for, for example, playing back music or providing telephone functionality through the speaker and microphone. The microphone can receive the speech input described herein and that input can be digitized and provided to a speech recognizer system as described herein.

A display controller and display device 909 can provide a visual user interface for the user; this interface may include a graphical user interface which is similar to that shown on a Macintosh computer when running OS X operating system software or iOS software on an iPhone or iPad. The system 900 also includes one or more wireless transceivers 903 to communicate with another data processing system. A wireless transceiver may be a WLAN transceiver (e.g. WiFi), an infrared transceiver, a Bluetooth transceiver, and/or a wireless cellular telephony transceiver. It will be appreciated that additional components, not shown, may also be part of the system 900 in certain embodiments, and in certain embodiments fewer components than shown in FIG. 9 may also be used in a data processing system. The system 900 further can include one or more communications ports 917 to communicate with another data processing system. The communications port may be a USB port, Firewire port, Bluetooth interface, a docking port, etc.

The data processing system 900 also includes one or more input devices 913 which are provided to allow a user to provide input to the system. These input devices may be a keypad or a keyboard or a touch panel or a multi-touch panel which is overlaid and integrated with a display device such as display device 909. The data processing system 900 can also include an optional input/output device which may be a connector for a dock. It will be appreciated that one or more buses, not shown, may be used to interconnect the various components as is well known in the art. The data processing system shown in FIG. 9 may be a handheld computer or a personal digital assistant (PDA), or a cellular telephone with PDA-like functionality, or a handheld computer which includes a cellular telephone, or a media player, such as an iPod, or a game or entertainment device, or devices which combine aspects or functions of these devices, such as a media player combined with a PDA and a cellular telephone in one device or an embedded device or other consumer electronic devices. In other embodiments, the data processing system 900 may be a network computer or an embedded processing device within another device, or other types of data processing systems which have fewer components or perhaps more components than that shown in FIG. 9.

Data processing system 900 can optionally include one or more hardware devices designed to digitize and store human speech received by the microphone in Audio I/O 905.

At least certain embodiments of the inventions may be part of a digital media player, such as a portable music and/or video media player, which may include a media processing system to present the media, a storage device to store the media and may further include a radio frequency (RF) transceiver (e.g., an RF transceiver for a cellular telephone) coupled with an antenna system and the media processing system. In certain embodiments, media stored on a remote storage device may be transmitted to the media player through the RF transceiver. The media may be, for example, one or more of music or other audio, still pictures, or motion pictures.

Examples of a portable media player are described in published U.S. Pat. No. 7,345,671 and U.S. published patent application number 2004/0224638, both of which are incorporated herein by reference.

One or more Application Programming Interfaces (APIs) may be used in some embodiments. An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component.

An API allows a developer of an API-calling component (which may be a third party developer) to leverage specified features provided by an API-implementing component. There may be one API-calling component or there may be more than one such component. An API can be a source code interface that a computer system or program library provides in order to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some embodiments the API-implementing component may provide more than one API, each providing a different view of or with different aspects that access different aspects of the functionality implemented by the API-implementing component. For example, one API of an API-implementing component can provide a first set of functions and can be exposed to third party developers, and another API of the API-implementing component can be hidden (not exposed) and provide a subset of the first set of functions and also provide another set of functions, such as testing or debugging functions which are not in the first set of functions. In other embodiments the API-implementing component may itself call one or more other components via an underlying API and thus be both an API-calling component and an API-implementing component.

An API defines the language and parameters that API-calling components use when accessing and using specified features of the API-implementing component. For example, an API-calling component accesses the specified features of the API-implementing component through one or more API calls or invocations (embodied for example by function or method calls) exposed by the API and passes data and control information using parameters via the API calls or invocations. The API-implementing component may return a value through the API in response to an API call from an API-calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API-calling component) and an API-implementing component. Transferring the API calls may include issuing, initiating, invoking, calling, receiving, returning, or responding to the function calls or messages; in other words, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (it should be understood that the API-implementing component and the API-calling component may be the same or different type of module from each other). API-implementing components may in some cases be embodied at least in part in firmware, microcode, or other hardware logic. In some embodiments, an API may allow a client program to use the services provided by a Software Development Kit (SDK) library. In other embodiments an application or other client program may use an API provided by an Application Framework. In these embodiments the application or client program may incorporate calls to functions or methods provided by the SDK and provided by the API or use data types or objects defined in the SDK and provided by the API. An Application Framework may in these embodiments provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low level logic that executes in part on the hardware component.

The API-calling component may be a local component (i.e., on the same data processing system as the API-implementing component) or a remote component (i.e., on a different data processing system from the API-implementing component) that communicates with the API-implementing component through the API over a network. It should be understood that an API-implementing component may also act as an API-calling component (i.e., it may make API calls to an API exposed by a different API-implementing component) and an API-calling component may also act as an API-implementing component by implementing an API that is exposed to a different API-calling component.

The API may allow multiple API-calling components written in different programming languages to communicate with the API-implementing component (thus the API may include features for translating calls and returns between the API-implementing component and the API-calling component); however the API may be implemented in terms of a specific programming language. An API-calling component can, in one embedment, call APIs from different providers such as a set of APIs from an OS provider and another set of APIs from a plug-in provider and another set of APIs from another provider (e.g. the provider of a software library) or creator of the another set of APIs.

Figure 11:
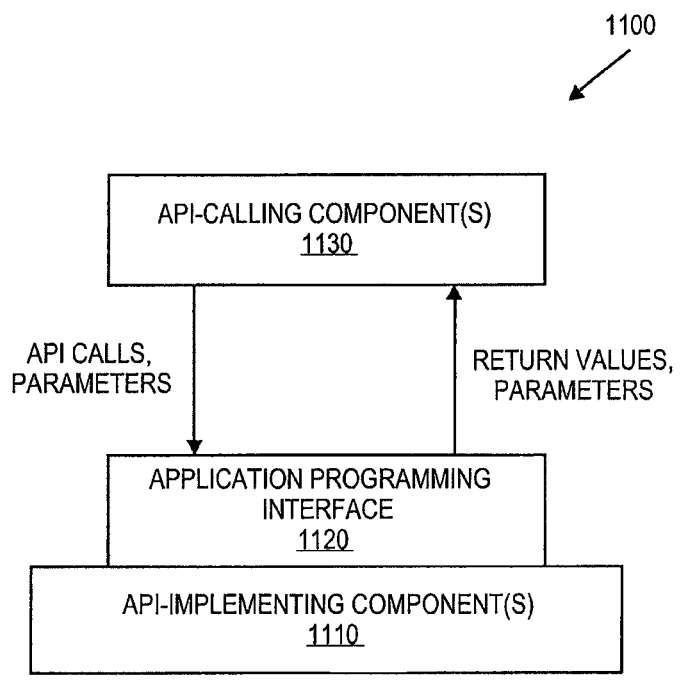
FIG. 11 is a block diagram illustrating an exemplary API architecture which may be used in some embodiments of the present invention.

FIG. 11 is a block diagram illustrating an exemplary API architecture, which may be used in some embodiments of the invention. As shown in FIG. 11, the API architecture 1100 includes the API-implementing component 1110 (e.g., an operating system, a library, a device driver, an API, an application program, software or other module) that implements the API 1120. The API 1120 specifies one or more functions, methods, classes, objects, protocols, data structures, formats and/or other features of the API-implementing component that may be used by the API-calling component 1130. The API 1120 can specify at least one calling convention that specifies how a function in the API-implementing component receives parameters from the API-calling component and how the function returns a result to the API-calling component. The API-calling component 1130 (e.g., an operating system, a library, a device driver, an API, an application program, software or other module), makes API calls through the API 1120 to access and use the features of the API-implementing component 1110 that are specified by the API 1120. The API-implementing component 1110 may return a value through the API 1120 to the API-calling component 1130 in response to an API call.

It will be appreciated that the API-implementing component 1110 may include additional functions, methods, classes, data structures, and/or other features that are not specified through the API 1120 and are not available to the API-calling component 1130. It should be understood that the API-calling component 1130 may be on the same system as the API-implementing component 1110 or may be located remotely and accesses the API-implementing component 1110 using the API 1120 over a network. While FIG. 11 illustrates a single API-calling component 1130 interacting with the API 1120, it should be understood that other API-calling components, which may be written in different languages (or the same language) than the API-calling component 1130, may use the API 1120.

The API-implementing component 1110, the API 1120, and the API-calling component 1130 may be stored in a machine-readable non-transitory storage medium, which includes any mechanism for storing information in a tangible form readable by a machine (e.g., a computer or other data processing system). For example, a machine-readable medium includes magnetic disks, optical disks, random access memory; read only memory, flash memory devices, etc. and can be a local storage medium or a storage medium on a remote device that is coupled to a client device by one or more networks.

Figure 10:
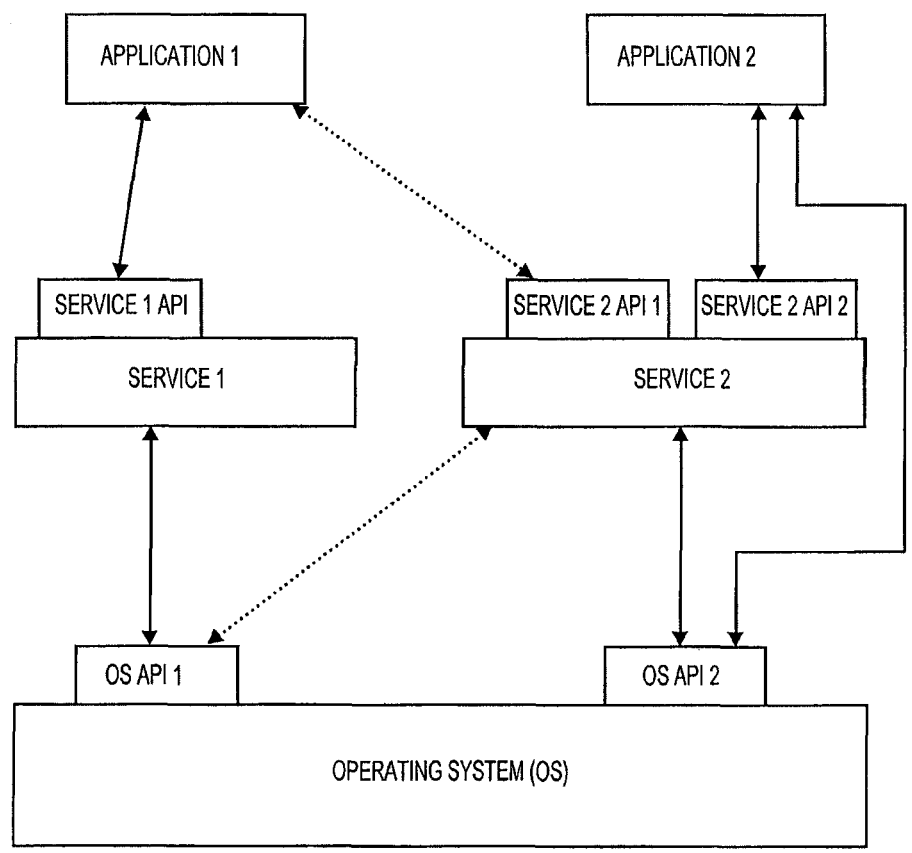
FIG. 10 is an example of a software stack which may be used in some embodiments of the present invention.

In FIG. 10 ("Software Stack"), an exemplary embodiment, applications can make calls to Services 1 or 2 using several Service APIs and to Operating System (OS) using several OS APIs. Services 1 and 2 can make calls to OS using several OS APIs.

Note that the Service 2 has two APIs, one of which (Service 2 API 1) receives calls from and returns values to Application 1 and the other (Service 2 API 2) receives calls from and returns values to Application 2. Service 1 (which can be, for example, a software library) makes calls to and receives returned values from OS API 1, and Service 2 (which can be, for example, a software library) makes calls to and receives returned values from both OS API 1 and OS API 2. Application 2 makes calls to and receives returned values from OS API 2.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A machine implemented method comprising:
receiving a speech input from a user of a data processing system;
determining a context, of the data processing system, when the speech input was received;
recognizing text in the speech input through a speech recognition system that includes an acoustic model and a language model, the recognizing of text producing a first text output;
storing the first text output as a parsed data structure having a plurality of tokens each of which represents a word in the first text output;
processing each of the tokens with a set of interpreters, each interpreter in the set being designed to search one or more databases to search for matches between one or more items in the databases and each of the tokens, each of the interpreters determining from any matches and from the context whether it can repair a token in the first text output, wherein each interpreter is designed to repair an error of a specific type in the first text output;
merging selected results from the set of interpreters to produce a final interpreted speech transcription which represents a repaired version of the first text output;
providing the final interpreted speech transcription to a selected application, in a set of applications, based on a command in the final interpreted speech transcription, the selected application to execute the command in the final interpreted speech transcription.

2. The method as in claim 1 wherein the context includes a history of prior user inputs and wherein the one or more databases comprises a contacts database which stores at least one of names, addresses and phone numbers.

3. The method as in claim 2 wherein the context includes a conversation history and wherein the one or more databases comprises a media database which stores at least one of song, titles, and artists and wherein an interpreter in the set of interpreters uses at least two consecutive words when evaluating a possible match.

4. The method as in claim 1 wherein a first interpreter, in the set of interpreters, uses a first algorithm to determine whether to repair a word and wherein a second interpreter, in the set of interpreters, uses a second algorithm to determine whether to repair a word, the first algorithm being different than the second algorithm.

5. The method as in claim 1 wherein a first interpreter, in the set of interpreters, uses a first algorithm to search the one or more databases and a second interpreter, in the set of interpreters, uses a second algorithm to search the one or more databases, and wherein the first algorithm and the second algorithm are different.

6. The method as in claim 1 wherein the interpreters in the set of interpreters do not attempt to repair the command.

7. The method as in claim 1 wherein the merging merges only non-overlapping results from the set of interpreters, and overlapping results from the set of interpreters are ranked in a ranked set and one result in the ranked set is selected and merged into the final interpreted speech transcription.

8. A machine readable non-transitory storage medium storing executable program instructions which when executed cause a data processing system to perform a method comprising:
   receiving a speech input from a user of a data processing system;
   determining a context, of the data processing system, when the speech input was received;
   recognizing text in the speech input through a speech recognition system that includes an acoustic model and a language model, the recognizing of text producing a first text output;
   storing the first text output as a parsed data structure having a plurality of tokens each of which represents a word in the first text output;
   processing each of the tokens with a set of interpreters, each interpreter in the set being designed to search one or more databases to search for matches between one or more items in the databases and at least one of the tokens, each of the interpreters determining from any matches and from the context whether it can repair a token in the first text output, wherein each interpreter is designed to repair an error of a specific type in the first text output;
   merging selected results from the set of interpreters to produce a final interpreted speech transcription which represents a repaired version of the first text output;
   providing the final interpreted speech transcription to a selected application, in a set of applications, based on a command in the final interpreted speech transcription, the selected application to execute the command in the final interpreted speech transcription.

9. The medium as in claim 8 wherein the context includes a history of prior user inputs and wherein the one or more databases comprises a contacts database which stores at least one of names, addresses and phone numbers.

10. The medium as in claim 9 wherein the context includes a conversation history and wherein the one or more databases comprises a media database which stores at least one of song, titles, and artists and wherein an interpreter in the set of interpreters uses at least two consecutive words when evaluating a possible match.

11. The medium as in claim 8 wherein a first interpreter, in the set of interpreters, uses a first algorithm to determine whether to repair a word and wherein a second interpreter, in the set of interpreters, uses a second algorithm to determine whether to repair a word, the first algorithm being different than the second algorithm.

12. The medium as in claim 8 wherein a first interpreter, in the set of interpreters, uses a first algorithm to search the one or more databases and a second interpreter, in the set of interpreters, uses a second algorithm to search the one or more databases, and wherein the first algorithm and the second algorithm are different.

13. The medium as in claim 8 wherein the interpreters in the set of interpreters do not attempt to repair the command.

14. The medium as in claim 8 wherein the merging merges only non-overlapping results from the set of interpreters, and overlapping results from the set of interpreters are ranked in a ranked set and one result in the ranked set is selected and merged into the final interpreted speech transcription.

15. A machine readable non-transitory storage medium storing executable program instructions which when executed cause a data processing system to perform a method comprising:
   receiving a speech input from a user of a data processing system;
   recognizing text in the speech input through a speech recognition system that includes an acoustic model and an optional language model, the recognizing of text producing a first text output;
   storing the first text output as a parsed data structure having a plurality of words in the first text output;
   processing at least one of the words with a set of interpreters, each interpreter in the set being designed to search one or more databases to search for matches between one or more items in the databases and the at least one of the words, each of the interpreters determining from any matches whether it can repair a word in the first text output, wherein each interpreter is designed to repair an error of a specific field in the one or more databases;
   merging repaired results from the set of interpreters to produce a final interpreted speech transcription which represents a repaired version of the first text output;
   providing the final interpreted speech transcription to a selected application, in a set of applications, based on a command in the final interpreted speech transcription, the selected application to execute the command in the final interpreted speech transcription.

16. The medium as in claim 15, wherein the method further comprises:
   determining a context, of the data processing system, when the speech input was received, wherein the context includes a history of prior user inputs and wherein the one or more databases comprises a contacts database which stores at least one of names, addresses and phone numbers;
   and wherein different interpreters, in the set of interpreters, use different algorithms to determine whether to repair a word in the first text output, and wherein each interpreter determines, through a score, whether it can repair a word in the first text output.

17. A data processing system comprising:
   a processor capable of recognizing text in a speech input and producing a first text output;

a context determining system which determines a context of the data processing system when the speech input is received;

a microphone coupled to the processor to provide the speech input to the processor;

a speech repair system coupled to the processor and coupled to the context determining system, the speech repair system including a set of interpreters, each of which is configured to repair an error of a certain type in recognized text, the certain type being determined by one or more fields in one or more databases which are searched by the set of interpreters.

18. The data processing system of claim 17 wherein the context includes a history of user inputs and wherein the set of interpreters use the context in a process of determining whether to repair one or more words in the first text output and wherein the processor is capable of recognizing text using an acoustic model and a language model.

19. The data processing system of claim 18 wherein the set of interpreters search the one or more databases to compare words in the first text output with one or more items in the one or more databases when determining whether to repair one or more words in the first text output.

20. A machine readable non-transitory storage medium storing executable program instructions which when executed cause a data processing system to perform a method comprising:

executing a speech assistant application which is a first application in a set of applications;

receiving a digitized speech input and recognizing text in the speech input through a speech recognition system which provides a first text output;

determining a command from the first text output;

selecting an application in the set of applications based on the command, wherein the selected application is different than the speech assistant application, the selected application being configured to execute the command with text from or derived from the first text output;

repairing text in the first text output through a set of interpreters each of which is configured to repair an error of a specific type, based on one or more fields of one or more databases, in the first text output; and merging results from the set of interpreters to produce a final interpreted transcription to the selected application.

21. The medium as in claim 20 wherein the method further comprises:

determining a context of the data processing system when the digitized speech input is received, and wherein the set of interpreters use the context when determining whether to repair one or more words in the first text output.

22. The medium as in claim 21 wherein a grammar parser determines the command from the first text output.

23. The medium as in claim 21 wherein the set of applications comprises at least two of: (a) a telephone dialer that uses the final interpreted transcription to dial a telephone number; (b) a media player for playing songs or other context; (c) a text messaging application; (d) an email application; (e) a calendar application; (f) a local search application; (g) a video conferencing application; or (h) a person or object locating application.

* * * * *